United States Patent
Zhao

(10) Patent No.: US 10,694,564 B2
(45) Date of Patent: Jun. 23, 2020

(54) BLUETOOTH PAIRING METHOD AND TERMINAL DEVICE

(71) Applicant: Huawei Technologies Co., Ltd., Shenzhen (CN)

(72) Inventor: Peng Zhao, Xi'an (CN)

(73) Assignee: HUAWEIO TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/345,126

(22) PCT Filed: Mar. 24, 2017

(86) PCT No.: PCT/CN2017/078107
§ 371 (c)(1),
(2) Date: Apr. 25, 2019

(87) PCT Pub. No.: WO2018/076604
PCT Pub. Date: May 3, 2018

(65) Prior Publication Data
US 2019/0289655 A1   Sep. 19, 2019

(30) Foreign Application Priority Data
Oct. 25, 2016  (CN) .......................... 2016 1 0938398

(51) Int. Cl.
*H04B 7/00*    (2006.01)
*H04B 5/00*    (2006.01)
(Continued)

(52) U.S. Cl.
CPC .............. *H04W 76/14* (2018.02); *H04B 5/02* (2013.01); *H04W 4/80* (2018.02); *H04W 12/003* (2019.01)

(58) Field of Classification Search
CPC ..... H04W 4/80; H04W 12/003; H04W 76/10; H04W 76/14; H04M 1/66; H04M 1/663;
(Continued)

(56) References Cited

U.S. PATENT DOCUMENTS 9,609,677 B2 * 3/2017 Tan ....................... H04W 12/08
9,674,707 B2 * 6/2017 Boettcher ............... H04M 1/67
(Continued)

FOREIGN PATENT DOCUMENTS

| CN | 102483915 A | 5/2012 |
|----|-------------|--------|
| CN | 102594988 A | 7/2012 |

(Continued)

OTHER PUBLICATIONS

Machine Translation and Abstract of Chinese Publication No. CN102594988, Jul. 18, 2012, 8 pages.
(Continued)

*Primary Examiner* — Quochien B Vuong
(74) *Attorney, Agent, or Firm* — Conley Rose, P.C.

(57) ABSTRACT

A Bluetooth pairing method includes: performing, by a terminal device, encryption computation on a first Bluetooth parameter to generate first pairing information; sending, by the terminal device, the first pairing information to a peer device; and when the terminal device determines that the first Bluetooth parameter is the same as a second Bluetooth parameter, and the peer device determines that the first Bluetooth parameter is the same as the second Bluetooth parameter, determining, by the terminal device, that Bluetooth pairing between the terminal device and the peer device is successful.

20 Claims, 10 Drawing Sheets

(51) Int. Cl.
*H04W 12/00* (2009.01)
*H04W 76/14* (2018.01)
*H04W 4/80* (2018.01)
*H04B 5/02* (2006.01)

(58) Field of Classification Search
CPC ........... H04M 1/7253; H04M 1/72519; H04M 2250/02
See application file for complete search history.

(56) References Cited

U.S. PATENT DOCUMENTS

| | | | |
|---|---|---|---|
| 9,730,007 B2* | 8/2017 | Murakawa | H04W 24/08 |
| 10,033,471 B2* | 7/2018 | Ma | H04W 4/80 |
| 10,397,843 B2* | 8/2019 | Fujita | H04W 76/15 |
| 2007/0143615 A1 | 6/2007 | Hiitola et al. | |
| 2009/0233550 A1 | 9/2009 | Ryu | |
| 2010/0332236 A1 | 12/2010 | Tan | |
| 2014/0370814 A1 | 12/2014 | Bi et al. | |
| 2016/0294485 A1 | 10/2016 | Ma et al. | |
| 2019/0281450 A1* | 9/2019 | Lu | H04W 76/00 |

FOREIGN PATENT DOCUMENTS

| | | |
|---|---|---|
| CN | 103178878 A | 6/2013 |
| CN | 104378145 A | 2/2015 |
| CN | 105188019 A | 12/2015 |
| CN | 105407445 A | 3/2016 |
| CN | 105450269 A | 3/2016 |
| CN | 105814807 A | 7/2016 |

OTHER PUBLICATIONS

Machine Translation and Abstract of Chinese Publication No. CN104378145, Feb. 25, 2015, 10 pages.
Machine Translation and Abstract of Chinese Publication No. CN105188019, Dec. 23, 2015, 15 pages.
Machine Translation and Abstract of Chinese Publication No. CN105407445, Mar. 16, 2016, 19 pages.
Foreign Communication From a Counterpart Application, PCT Application No. PCT/CN2017/078107, English Translation of International Search Report dated Jun. 28, 2017, 2 pages.
Foreign Communication From a Counterpart Application, PCT Application No. PCT/CN2017/078107, English Translation of Written Opinion dated Jun. 28, 2017, 4 pages.
Machine Translation and Abstract of Chinese Publication No. CN105450269, Mar. 30, 2016, 59 pages.
Foreign Communication From a Counterpart Application, Chinese Application No. 201780024058.1, Chinese Office Action dated Jan. 6, 2020, 12 pages.

* cited by examiner

BLUETOOTH PAIRING METHOD AND TERMINAL DEVICE

CROSS-REFERENCE TO RELATED APPLICATIONS

This application is a National Stage application of International Application No. PCT/CN2017/078107, filed Mar. 24, 2017, which claims priority to Chinese Patent Application No. 201610938398.2, filed on Oct. 25, 2016. Both of the aforementioned applications are hereby incorporated by reference in their entireties.

This application claims priority to Chinese Patent Application No. 201610938398.2, filed with the Chinese Patent Office on Oct. 25, 2016 and entitled "BLUETOOTH PAIRING METHOD AND TERMINAL DEVICE", which is incorporated herein by reference in its entirety.

TECHNICAL FIELD

The present invention relates to the field of communications technologies, and in particular, to a Bluetooth pairing method and a terminal device.

BACKGROUND

Bluetooth is a radio technology that supports communication between devices over a short distance. Currently, there are more products having Bluetooth functions. In the prior art, when establishing a Bluetooth connection between two devices, a user first needs to manually enable a Bluetooth function of a device. For example, the user needs to manually enter a Bluetooth setting interface of a mobile phone, and enable a Bluetooth function of the mobile phone in the Bluetooth setting interface. If the device is a slave device in Bluetooth pairing, the user needs to manually set the Bluetooth function of the slave device as visible, so that the slave device can be scanned by a master device in Bluetooth pairing. When the user establishes a connection between the two devices, the user needs to input a pairing password on the two devices separately. After the password is input, the two devices authenticate each other and complete Bluetooth pairing.

A disadvantage of Bluetooth pairing used in the prior art is as follows: In a conventional Bluetooth pairing process, the user needs to perform settings for a plurality of times, and to complete pairing, the two devices need to learn information in advance, such as a Bluetooth name or a Media Access Control MAC address of a peer device. Obviously, efficiency of a Bluetooth pairing method provided by the prior art is low. In addition, when the user performs operations manually, a misoperation easily occurs, and even a wrong device is connected. Moreover, when establishing a connection every time, the user needs to input a pairing password, a pairing operation process is complex, and accuracy and usability are low.

SUMMARY

Embodiments of the present invention provide a Bluetooth pairing method and a terminal device featuring simple operations and high accuracy to improve Bluetooth pairing efficiency.

A first aspect of the embodiments of the present invention provides a Bluetooth pairing method, including the following steps.

Step A: A terminal device receives a first Bluetooth parameter input by a user.

The terminal device shown in this embodiment may be a master device or a slave device in Bluetooth pairing.

The first Bluetooth parameter may be input by the user to the master device and the slave device simultaneously by using a voice, or the first Bluetooth parameter may be input by the user to the master device and the slave device separately by using a voice. Certainly, the first Bluetooth parameter may also be input by the user by using a touchscreen. This is not specifically limited in this embodiment.

The first Bluetooth parameter shown in this embodiment may include any character input by the user, and the character may be a character in any language such as a Chinese character or an English character, or the character may be a numeric character.

The terminal device shown in this embodiment may preprocess the first Bluetooth parameter.

Specifically, after receiving the first Bluetooth parameter input by the user, the terminal device shown in this embodiment may encode the first Bluetooth parameter to generate an encoded first Bluetooth parameter.

Step B: The terminal device generates first pairing information.

Specifically, the terminal device shown in this embodiment can perform encryption computation based on the first Bluetooth parameter to generate the first pairing information.

More specifically, the terminal device shown in this embodiment may perform encryption processing on the first Bluetooth parameter to generate the first pairing information including the first Bluetooth parameter.

Step C: The terminal device sends the first pairing information to a peer device.

If the terminal device is a master device, the master device sends the generated first pairing information to a slave device used as the peer device.

If the terminal device is a slave device, the slave device sends the generated first pairing information to a master device used as the peer device.

Step D: The terminal device receives second pairing information sent by the peer device.

The second pairing information is information generated by the peer device by performing encryption computation based on a second Bluetooth parameter received by the peer device.

The first Bluetooth parameter and the second Bluetooth parameter shown in this embodiment are the same parameter.

For a specific process of generating the second pairing information by the peer device in this embodiment, refer to a specific process of generating the first pairing information by the terminal device. Details are not further described.

Step E: The terminal device determines whether a target condition is satisfied, and if yes, performs step F.

Specifically, the target condition is that the terminal device has determined, based on the second pairing information, that the first Bluetooth parameter is the same as the second Bluetooth parameter; and the target condition is further that the peer device has determined, based on the first pairing information, that the first Bluetooth parameter is the same as the second Bluetooth parameter.

The terminal device side needs to determine that the first Bluetooth parameter is the same as the second Bluetooth parameter, and the peer device side also needs to determine that the first Bluetooth parameter is the same as the second Bluetooth parameter.

Step F: The terminal device determines that Bluetooth pairing between the terminal device and the peer device is successful.

In this embodiment, if the terminal device determines that the target condition is satisfied, the terminal device may determine that Bluetooth pairing between the terminal device and the peer device is successful.

By using the method shown in this embodiment, in a specific process of Bluetooth pairing, the user does not need to manually configure the terminal device, and the user needs to input the Bluetooth parameters only once, and then Bluetooth pairing can be automatically performed between the terminal device and the peer device. In the process of Bluetooth pairing between the terminal device and the peer device, the user does not need to perform any action.

In the process in which the terminal device automatically completes pairing, the user does not need to input a pairing password manually. Therefore, a case in which Bluetooth pairing cannot be established because the user manually inputs a wrong pairing password is avoided, learning costs of the user in learning Bluetooth pairing are reduced, accuracy in the Bluetooth pairing process is improved, and usability is high.

According to the method shown in this embodiment, the Bluetooth parameters can be encrypted. Therefore, security of Bluetooth pairing is enhanced, and a possibility that a third party steals data exchanged between the two devices is effectively avoided.

With reference to the first aspect of this embodiment of the present invention, in a first implementation of the first aspect of this embodiment of the present invention, assuming that the terminal device is a slave device in Bluetooth pairing, and that the peer device is a master device in Bluetooth pairing, before step C shown in this embodiment, the following steps further need to be performed.

Step C1: The terminal device receives a Bluetooth instruction input by the user.

The Bluetooth instruction in this embodiment may be input once by using a voice when the user inputs the first Bluetooth parameter to the terminal device.

Step C2: The terminal device generates a broadcast packet based on the Bluetooth instruction.

The broadcast packet shown in this embodiment is used to establish a physical-layer Bluetooth connection between the terminal device and the peer device.

Step C3: The terminal device sends the broadcast packet to the peer device.

The broadcast packet is sent in this embodiment, so that the peer device initiates a physical-layer Bluetooth connection to the terminal device based on the broadcast packet.

By using the method shown in this embodiment, the terminal device can determine, based on the broadcast packet, whether the peer device is a legal device; and the terminal device can initiate the physical-layer Bluetooth connection to the terminal device only when the peer device is a legal device, thereby effectively ensuring security in the process of Bluetooth pairing between the terminal device and the peer device.

With reference to the first aspect of this embodiment of the present invention, in a second implementation of the first aspect of this embodiment of the present invention, assuming that the terminal device is a master device in Bluetooth pairing, and that the peer device is a slave device in Bluetooth pairing, before step C shown in this embodiment, the following steps further need to be performed.

Step C11: The terminal device receives a broadcast packet sent by the peer device.

The broadcast packet shown in this embodiment is a packet generated by the peer device based on a Bluetooth instruction received by the peer device.

The broadcast packet is used to establish a physical-layer Bluetooth connection between the terminal device and the peer device.

Step C12: The terminal device initiates a physical-layer Bluetooth connection to the peer device based on the broadcast packet.

By using the method shown in this embodiment, the terminal device can determine, based on the broadcast packet, whether the peer device is a legal device; and the terminal device can initiate the physical-layer Bluetooth connection to the terminal device only when the peer device is a legal device, thereby effectively ensuring security in the process of Bluetooth pairing between the terminal device and the peer device.

With reference to the second implementation of the first aspect of this embodiment of the present invention, in a third implementation of the first aspect of this embodiment of the present invention, the step C2 further includes the following steps.

Step C21: The terminal device randomly generates a first random number based on the Bluetooth instruction.

The first random number is not limited in this embodiment.

Step C22: The terminal device sets the first random number as a Bluetooth name of the terminal device.

Step C23: The terminal device sets the first random number in the broadcast packet.

After the terminal device performs the step C3 so that terminal device sends the broadcast packet to the peer device, the terminal device further performs the following step.

Step C24: The terminal device receives the second pairing information.

In this embodiment, if the peer device determines that the broadcast packet satisfies a first preset condition, the peer device sends the second pairing information to the terminal device, where the first preset condition is that the Bluetooth name of the terminal device scanned by the peer device is the same as the first random number included in the broadcast packet.

By using the method shown in this embodiment, the terminal device can perform encryption to generate the broadcast packet, so that the terminal device receives the second pairing information sent by the peer device only when the broadcast packet is verified by the peer device, thereby effectively ensuring security in the process of Bluetooth pairing between the terminal device and the peer device.

With reference to the second implementation of the first aspect of this embodiment of the present invention, in a fourth implementation of the first aspect of this embodiment of the present invention, before the step C, the following step further needs to be performed.

Step C030: The terminal device performs scanning to obtain a Bluetooth name of the peer device.

The step C includes the following steps.

Step C101: The terminal device determines whether the broadcast packet satisfies a first preset condition, and if yes, performs step C102.

The broadcast packet includes a first random number randomly generated by the peer device, and the first preset condition is that the Bluetooth name of the peer device scanned by the terminal device is the same as the first random number included in the broadcast packet.

When the terminal device determines that the broadcast packet satisfies the first preset condition, the terminal device may determine that the peer device is a legal device.

Step C102: The terminal device sends the first pairing information to the peer device.

If the terminal device determines that the broadcast packet satisfies the first preset condition, the terminal device sends the first pairing information to the peer device.

By using the method shown in this embodiment, the terminal device can determine the received broadcast packet, so that the terminal device sends the first pairing information to the peer device only when the broadcast packet is verified, thereby effectively ensuring security in the process of Bluetooth pairing between the terminal device and the peer device.

With reference to the first implementation of the first aspect of this embodiment of the present invention, in a fifth implementation of the first aspect of this embodiment of the present invention, the step C2 includes the following steps.

Step C25: The terminal device randomly generates a first random number and a second random number.

Step C26: The terminal device sets the first random number as a Bluetooth name of the terminal device.

Step C27: The terminal device generates first verification data.

Specifically, the terminal device performs computation on the first random number and the second random number based on a first algorithm to generate the first verification data.

Step C28: The terminal device sets the first random number, the second random number, and the first verification data in the broadcast packet.

In this embodiment, when the peer device receives the broadcast packet, if the peer device determines that the broadcast packet satisfies a second preset condition, the peer device sends the second pairing information to the terminal device.

Specifically, the second preset condition is that the Bluetooth name of the terminal device scanned by the peer device is the same as the first random number included in the broadcast packet, the second preset condition is further that third verification data computed by the peer device is the same as the first verification data, the third verification data is data obtained by the peer device by performing computation on the first random number and the second random number based on a third algorithm, and the third algorithm and the first algorithm are the same algorithm.

By using the method shown in this embodiment, the terminal device can perform encryption to generate the broadcast packet, so that the terminal device receives the second pairing information sent by the peer device only when the broadcast packet is verified by the peer device, thereby effectively ensuring security in the process of Bluetooth pairing between the terminal device and the peer device.

With reference to the second implementation of the first aspect of this embodiment of the present invention, in a sixth implementation of the first aspect of this embodiment of the present invention, before the step C, the following step further needs to be performed.

Step C001: The terminal device performs scanning to obtain a Bluetooth name of the peer device.

The step C specifically includes the following steps.

Step C31: The terminal device generates third verification data.

Specifically, the terminal device performs, based on a third algorithm, computation on a first random number and a second random number included in the broadcast packet to generate the third verification data.

Step C32: The terminal device determines Whether the broadcast packet satisfies a second preset condition, and if yes, performs step C33.

The second preset condition is that the Bluetooth name of the peer device scanned by the terminal device is the same as the first random number included in the broadcast packet.

The second preset condition is further that the third verification data and first verification data included in the broadcast packet are the same data.

The first verification data is data generated by the peer device by performing computation on the first random number and the second random number based on a first algorithm, and the third algorithm and the first algorithm are the same algorithm.

Step C33: The terminal device sends the first pairing information to the peer device.

In this embodiment, if the terminal device determines that the broadcast packet satisfies the second preset condition, the terminal device sends the first pairing information to the peer device.

By using the method shown in this embodiment, the terminal device can determine the received broadcast packet, so that the terminal device sends the first pairing information to the peer device only when the broadcast packet is verified, thereby effectively ensuring security in the process of Bluetooth pairing between the terminal device and the peer device.

With reference to the first implementation of the first aspect of this embodiment of the present invention, in a seventh implementation of the first aspect of this embodiment of the present invention, the step C2 includes the following steps.

Step C21: The terminal device randomly generates a first random number and a second random number.

Step C22: The terminal device generates second verification data.

Specifically, the terminal device performs computation on the first random number and the second random number based on a second algorithm to generate the second verification data.

Step C23: The terminal device sets the first random number, the second random number, and the second verification data in the broadcast packet.

In this embodiment, if the peer device determines that the broadcast packet satisfies a third preset condition, the peer device sends the second pairing information to the terminal device.

The third preset condition is that fourth verification data computed by the peer device is the same as the second verification data, and the fourth verification data is data obtained by the peer device by performing computation on the first random number and the second random number based on a fourth algorithm.

The fourth algorithm and the second algorithm are the same algorithm.

By using the method shown in this embodiment, the terminal device can perform encryption to generate the broadcast packet, so that the terminal device receives the second pairing information sent by the peer device only when the broadcast packet is verified by the peer device, thereby effectively ensuring security in the process of Bluetooth pairing between the terminal device and the peer device.

With reference to the second implementation of the first aspect of this embodiment of the present invention, in an eighth implementation of the first aspect of this embodiment of the present invention, the step C includes the following steps.

Step C41: The terminal device generates fourth verification data.

The terminal device performs, based on a fourth algorithm, computation on a first random number and a second random number included in the broadcast packet to generate the fourth verification data.

Step C42: The terminal device determines whether the broadcast packet satisfies a third preset condition, and if yes, performs step C43.

The third preset condition is that the fourth verification data and second verification data included in the broadcast packet are the same data, and the second verification data is data obtained by the peer device by performing computation on the first random number and the second random number based on a second algorithm.

The fourth algorithm and the second algorithm are the same algorithm.

Step C43: The terminal device sends the first pairing information to the peer device.

If the terminal device determines that the broadcast packet satisfies the third preset condition, the terminal device sends the first pairing information to the peer device.

By using the method shown in this embodiment, the terminal device can determine the received broadcast packet, so that the terminal device sends the first pairing information to the peer device only when the broadcast packet is verified, thereby effectively ensuring security in the process of Bluetooth pairing between the terminal device and the peer device.

With reference to the first aspect of this embodiment of the present invention, in a ninth implementation of the first aspect of this embodiment of the present invention, the step E further includes the following steps.

Step E1: The terminal device determines, based on the second pairing information, whether the first Bluetooth parameter is the same as the second Bluetooth parameter, and if yes, performs step E2.

Step E2: The terminal device determines that the target condition is satisfied.

Specifically, if the terminal device determines that the first Bluetooth parameter is the same as the second Bluetooth parameter, the terminal device determines that the target condition is satisfied.

By using the method shown in this embodiment, the terminal device needs to determine the second pairing information; and the subsequent Bluetooth pairing process is performed only when the second pairing information satisfies the target condition, thereby enhancing security of Bluetooth pairing, and effectively avoiding a possibility that a third party steals data exchanged between the two devices.

With reference to the first aspect of this embodiment of the present invention, in a tenth implementation of the first aspect of this embodiment of the present invention, after the step D, the following steps further need to be performed.

Step D1: The terminal device determines, based on the second pairing information, whether the first Bluetooth parameter is the same as the second Bluetooth parameter, and if yes, performs step D2.

Step D2: Trigger the step in which the terminal device sends the first pairing information to the peer device.

In this embodiment, if the terminal device determines that the first Bluetooth parameter is the same as the second Bluetooth parameter, step B is triggered.

The step E includes the following steps.

Step E3: If the terminal device receives indication information sent by the peer device, the terminal device determines that the target condition is satisfied.

The indication information is used to indicate that the peer device has determined that the first Bluetooth parameter is the same as the second Bluetooth parameter.

Step E4: If the terminal device does not receive the indication information sent by the peer device, the terminal device determines that the target condition is not satisfied.

By using the method shown in this embodiment, the terminal device needs to determine the second pairing information; and the subsequent Bluetooth pairing process is performed only when the second pairing information satisfies the target condition, thereby enhancing security of Bluetooth pairing, and effectively avoiding a possibility that a third party steals data exchanged between the two devices.

With reference to the first aspect of this embodiment of the present invention, the ninth implementation of the first aspect of this embodiment of the present invention, or the tenth implementation of the first aspect of this embodiment of the present invention, in an eleventh implementation of the first aspect of this embodiment of the present invention, the step B includes the following steps.

Step B1: The terminal device receives a Bluetooth instruction input by the user.

Step B2: The terminal device randomly generates a third random number based on the Bluetooth instruction.

Step B3: The terminal device generates a first pairing parameter.

Specifically, the terminal device performs computation on the first Bluetooth parameter and the third random number based on a fifth algorithm to generate the first pairing parameter.

Step B4: The terminal device sends the first pairing information including the first pairing parameter and the third random number to the peer device.

In this embodiment, the peer device performs computation on the third random number and the second Bluetooth parameter based on the fifth algorithm to generate a second pairing parameter, and if the first pairing parameter is the same as the second pairing parameter, the peer device determines that the first Bluetooth parameter is the same as the second Bluetooth parameter.

With reference to the ninth implementation of the first aspect of this embodiment of the present invention or the tenth implementation of the first aspect of this embodiment of the present invention, in a twelfth implementation of the first aspect of this embodiment of the present invention, after the step D, the following step further needs to be performed.

Step D1: The terminal device obtains a third pairing parameter and a fourth random number included in the second pairing information.

The fourth random number is data randomly generated by the peer device, and the third pairing information is data obtained by the peer device by performing computation on the second Bluetooth parameter and the fourth random number based on a sixth algorithm.

After the step D1, the following steps further need to be performed.

Step D11: The terminal device performs computation on the first Bluetooth parameter and the fourth random number based on the sixth algorithm to generate a fourth pairing parameter.

Step D12: The terminal device determines whether the third pairing parameter is the same as the fourth pairing parameter.

Step D13: If the terminal device determines that the third pairing parameter is the same as the fourth pairing parameter, the terminal device determines that the first Bluetooth parameter is the same as the second Bluetooth parameter.

Step D14: If the terminal device determines that the third pairing parameter is different from the fourth pairing parameter, the terminal device determines that the first Bluetooth parameter is different from the second Bluetooth parameter.

By using the method shown in this embodiment, the terminal device and the peer device perform Bluetooth pairing only when both the terminal device and the peer device determine that the first Bluetooth parameter and the second Bluetooth parameter are the same parameter, thereby enhancing security of Bluetooth pairing and effectively avoiding a possibility that a third party steals data exchanged between the two devices.

A second aspect of the embodiments of the present invention provides a terminal device, including:

a first receiving unit, configured to receive a first Bluetooth parameter input by a user, where the first receiving unit shown in this embodiment is configured to perform step A, and a specific execution process is not further described;

a computation unit, configured to perform encryption computation based on the first Bluetooth parameter to generate first pairing information, where the computation unit shown in this embodiment is configured to perform step B, and a specific execution process is not further described;

a first sending unit, configured to send the first pairing information to a peer device, where
 the first sending unit shown in this embodiment is configured to perform step C, and a specific execution process is not further described;

a second receiving unit, configured to receive second pairing information sent by the peer device, where the second pairing information is information generated by the peer device by performing encryption computation based on a second Bluetooth parameter received by the peer device, where the second receiving unit shown in this embodiment is configured to perform step D, and a specific execution process is not further described;

a judging unit, configured to determine whether a target condition is satisfied, where the target condition is that it is determined, based on the second pairing information, that the first Bluetooth parameter is the same as the second Bluetooth parameter, and the target condition is further that the peer device has determined, based on the first pairing information, that the first Bluetooth parameter is the same as the second. Bluetooth parameter, where the judging unit shown in this embodiment is configured to perform step E, and a specific execution process is not further described; and a determining unit, configured to determine, if the judging unit determines that the target condition is satisfied, that Bluetooth pairing between the terminal device and the peer device is successful, where the determining unit shown in this embodiment is configured to perform step F, and a specific execution process is not further described.

For specific beneficial effects of using the terminal device shown in this embodiment to perform the Bluetooth pairing method, refer to the foregoing embodiment. Details are not further described.

With reference to the second aspect of this embodiment of the present invention, in a first implementation of the second aspect of this embodiment of the present invention, if the terminal device is a slave device in Bluetooth pairing, and the peer device is a master device in Bluetooth pairing, the terminal device further includes:

a second sending unit, configured to receive a Bluetooth instruction input by the user, further configured to generate a broadcast packet based on the Bluetooth instruction, and further configured to send the broadcast packet to the peer device, so that the peer device initiates a physical-layer Bluetooth connection to the terminal device based on the broadcast packet.

The second sending unit shown in this embodiment is configured to perform step C1, step C2, and step C3, and a specific execution process is not further described.

The second sending unit shown in this embodiment is configured to perform step C3, and a specific execution process is not further described.

With reference to the second aspect of this embodiment of the present invention, in a second implementation of the second aspect of this embodiment of the present invention, if the terminal device is a master device in Bluetooth pairing, and the peer device is a slave device in Bluetooth pairing, the terminal device further includes:

a third sending unit, configured to receive a broadcast packet sent by the peer device, where the broadcast packet is a packet generated by the peer device based on a Bluetooth instruction received by the peer device, and further configured to initiate a physical-layer Bluetooth connection to the peer device based on the broadcast packet.

The third sending unit shown in this embodiment is configured to perform step C11 and step C12, and a specific execution process is not further described.

With reference to the first implementation of the second aspect of this embodiment of the present invention, in a third implementation of the second aspect of this embodiment of the present invention, the second sending unit is further configured to randomly generate a first random number based on the Bluetooth instruction, further configured to set the first random number as a Bluetooth name of the terminal device, and further configured to set the first random number in the broadcast packet, so that if the peer device determines that the broadcast packet satisfies a first preset condition, the peer device sends the second pairing information to the terminal device, where the first preset condition is that the Bluetooth name of the terminal device scanned by the peer device is the same as the first random number included in the broadcast packet.

The second sending unit shown in this embodiment is configured to perform step C21, step C22, step C23, and step C24, and a specific execution process is not further described.

With reference to the second implementation of the second aspect of this embodiment of the present invention, in a fourth implementation of the second aspect of this embodiment of the present invention, the first receiving unit is further configured to perform scanning to obtain a Bluetooth name of the peer device.

The first receiving unit shown in this embodiment is configured to perform step C030, and a specific execution process is not further described.

The first sending unit is further configured to determine whether the broadcast packet satisfies a first preset condition, where the broadcast packet includes a first random number randomly generated by the peer device, and the first preset condition is that the Bluetooth name of the scanned peer device is the same as the first random number included in the broadcast packet, and further configured to send the first pairing information to the peer device if it is determined that the broadcast packet satisfies the first preset condition.

The first sending unit shown in this embodiment is configured to perform step C101 and step C102, and a specific execution process is not further described.

With reference to the first implementation of the second aspect of this embodiment of the present invention, in a fifth implementation of the second aspect of this embodiment of the present invention, the second sending unit is further configured to randomly generate a first random number and a second random number, further configured to set the first random number as a Bluetooth name of the terminal device, further configured to perform computation on the first random number and the second random number based on a first algorithm to generate first verification data, and further configured to set the first random number, the second random number, and the first verification data in the broadcast packet, so that if the peer device determines that the broadcast packet satisfies a second preset condition, the peer device sends the second pairing information to the terminal device, where the second preset condition is that the Bluetooth name of the terminal device scanned by the peer device is the same as the first random number included in the broadcast packet, the second preset condition is further that third verification data computed by the peer device is the same as the first verification data, the third verification data is data obtained by the peer device by performing computation on the first random number and the second random number based on a third algorithm, and the third algorithm and the first algorithm are the same algorithm.

The second sending unit shown in this embodiment is configured to perform step C25, step C26, step C27, and step C28, and a specific execution process is not further described.

With reference to the second implementation of the second aspect of this embodiment of the present invention, in a sixth implementation of the second aspect of this embodiment of the present invention, the first receiving unit is further configured to perform scanning to obtain a Bluetooth name of the peer device.

The first receiving unit shown in this embodiment is configured to perform step C001, and a specific execution process is not further described.

The first sending unit is further configured to perform, based on a third algorithm, computation on a first random number and a second random number included in the broadcast packet to generate third verification data, further configured to determine whether the broadcast packet satisfies a second preset condition, where the second preset condition is that the Bluetooth name of the peer device scanned by the terminal device is the same as the first random number included in the broadcast packet, the second preset condition is further that the third verification data and first verification data included in the broadcast packet are the same data, the first verification data is data generated by the peer device by performing computation on the first random number and the second random number based on a first algorithm, and the third algorithm and the first algorithm are the same algorithm, and further configured to send the first pairing information to the peer device if it is determined that the broadcast packet satisfies the second preset condition.

The first sending unit shown in this embodiment is configured to perform step C31, step C32, and step C33, and a specific execution process is not further described.

With reference to the first implementation of the second aspect of this embodiment of the present invention, in a seventh implementation of the second aspect of this embodiment of the present invention, the second sending unit is further configured to randomly generate a first random number and a second random number, further configured to perform computation on the first random number and the second random number based on a second algorithm to generate second verification data, and further configured to set the first random number, the second random number, and the second verification data in the broadcast packet, so that if the peer device determines that the broadcast packet satisfies a third preset condition, the peer device sends the second pairing information to the terminal device, where the third preset condition is that fourth verification data computed by the peer device is the same as the second verification data, the fourth verification data is data obtained by the peer device by performing computation on the first random number and the second random number based on a fourth algorithm, and the fourth algorithm and the second algorithm are the same algorithm.

The second sending unit shown in this embodiment is configured to perform step C21, step C22, and step C23, and a specific execution process is not further described.

With reference to the second implementation of the second aspect of this embodiment of the present invention, in an eighth implementation of the second aspect of this embodiment of the present invention, the first sending unit is further configured to perform, based on a fourth algorithm, computation on a first random number and a second random number included in the broadcast packet to generate fourth verification data, further configured to determine whether the broadcast packet satisfies a third preset condition, where the third preset condition is that the fourth verification data and second verification data included in the broadcast packet are the same data, the second verification data is data obtained by the peer device by performing computation on the first random number and the second random number based on a second algorithm, and the fourth algorithm and the second algorithm are the same algorithm, and further configured to send the first pairing information to the peer device if it is determined that the broadcast packet satisfies the third preset condition.

The first sending unit shown in this embodiment is configured to perform step C41, step C42, step C43, step E1, and step E2, and a specific execution process is not further described.

With reference to the second aspect of this embodiment of the present invention, in a tenth implementation of the second aspect of this embodiment of the present invention, the terminal device further includes:

the judging unit is further configured to determine, based on the second pairing information, whether the first Bluetooth parameter is the same as the second Bluetooth parameter, and further configured to determine, if it is determined that the first Bluetooth parameter is the same as the second Bluetooth parameter, that the target condition is satisfied.

The judging unit shown in this embodiment is configured to perform step D1, step D2, step E3, and step E4, and a specific execution process is not further described.

With reference to the second aspect of this embodiment of the present invention, the ninth implementation of the second aspect of this embodiment of the present invention, or the tenth implementation of the second aspect of this embodiment of the present invention, in an eleventh implementation of the second aspect of this embodiment of the present invention, the computation unit is further configured to receive a Bluetooth instruction input by the user, further configured to randomly generate a third random number based on the Bluetooth instruction, further configured to perform computation on the first Bluetooth parameter and the third random number based on a fifth algorithm to generate a first pairing parameter, and further configured to send the first pairing information including the first pairing parameter and the third random number to the peer device, so that the peer device performs computation on the third random number and the second Bluetooth parameter based on the fifth algorithm to generate a second pairing parameter, and that if the first pairing parameter is the same as the second pairing parameter, the peer device determines that the first Bluetooth parameter is the same as the second Bluetooth parameter.

The computation unit shown in this embodiment is configured to perform step B1, step B2, step B3, and step B4, and a specific execution process is not further described.

With reference to the ninth implementation of the second aspect of this embodiment of the present invention, in a twelfth implementation of the second aspect of this embodiment of the present invention, the judging unit is further configured to obtain a third pairing parameter and a fourth random number included in the second pairing information, where the fourth random number is data randomly generated by the peer device, and the third pairing information is data obtained by the peer device by performing computation on the second Bluetooth parameter and the fourth random number based on a sixth algorithm, further configured to perform computation on the first Bluetooth parameter and the fourth random number based on the sixth algorithm to generate a fourth pairing parameter, further configured to determine whether the third pairing parameter is the same as the fourth pairing parameter, and further configured to determine, if it is determined that the third pairing parameter is the same as the fourth pairing parameter, that the first Bluetooth parameter is the same as the second Bluetooth parameter, or further configured to determine, if it is determined that the third pairing parameter is different from the fourth pairing parameter, that the first Bluetooth parameter is different from the second Bluetooth parameter.

The judging unit shown in this embodiment is configured to perform step D1, step D11, step D12, step D13, and step D14, and a specific execution process is not further described.

With reference to the tenth implementation of the second aspect of this embodiment of the present invention, in a thirteenth implementation of the second aspect of this embodiment of the present invention, the judging unit is further configured to obtain a third pairing parameter and a fourth random number included in the second pairing information, where the fourth random number is data randomly generated by the peer device, and the third pairing information is data obtained by the peer device by performing computation on the second Bluetooth parameter and the fourth random number based on a sixth algorithm, further configured to perform computation on the first Bluetooth parameter and the fourth random number based on the sixth algorithm to generate a fourth pairing parameter, further configured to determine whether the third pairing parameter is the same as the fourth pairing parameter, and further configured to determine, if it is determined that the third pairing parameter is the same as the fourth pairing parameter, that the first Bluetooth parameter is the same as the second Bluetooth parameter, or further configured to determine, by the terminal device if it is determined that the third pairing parameter is different from the fourth pairing parameter, that the first Bluetooth parameter is different from the second Bluetooth parameter.

The judging unit shown in this embodiment is configured to perform step D1, step D11, step D12, step D13, and step D14, and a specific execution process is not further described.

A third aspect of the embodiments of the present invention provides a terminal device, where the terminal device includes:

one or more processors, a memory, a bus system, and one or more programs, where the processor and the memory are connected by the bus system, where the one or more programs are stored in the memory, the one or more programs include an instruction, and when the instruction is executed by the terminal device, the terminal device performs the method based on any one of the first aspect of this embodiment of the present invention to the twelfth implementation of the first aspect of this embodiment of the present invention.

A fourth aspect of the embodiments of the present invention provides a computer readable storage medium storing one or more programs, where the one or more programs include an instruction, and when the instruction is executed by a terminal device, the terminal device performs the method based on any one of the first aspect of this embodiment of the present invention to the twelfth implementation of the first aspect of this embodiment of the present invention.

The present invention provides a Bluetooth pairing method and a terminal device. The method includes: performing, by a terminal device, encryption computation on a first Bluetooth parameter to generate first pairing information; sending, by the terminal device, the first pairing information to a peer device; and when the terminal device determines that the first Bluetooth parameter is the same as the second Bluetooth parameter, and the peer device determines that the first Bluetooth parameter is the same as the second Bluetooth parameter, determining, by the terminal device, that Bluetooth pairing between the terminal device and the peer device is successful. Obviously, a user needs to input the Bluetooth parameters only once, and then Bluetooth pairing can be automatically performed between the terminal device and the peer device. Therefore, accuracy in a Bluetooth pairing process is improved, and usability is high. In addition, security of Bluetooth pairing is enhanced, and a possibility that a third party steals data exchanged between the two devices is effectively avoided.

DESCRIPTION OF EMBODIMENTS

Embodiments of the present invention provide a Bluetooth pairing method featuring simple operations, simplified processes, high accuracy, and high usability.

First, a physical structure of a terminal device that can implement a Bluetooth pairing method provided by an embodiment of the present invention is described.

Figure 1:
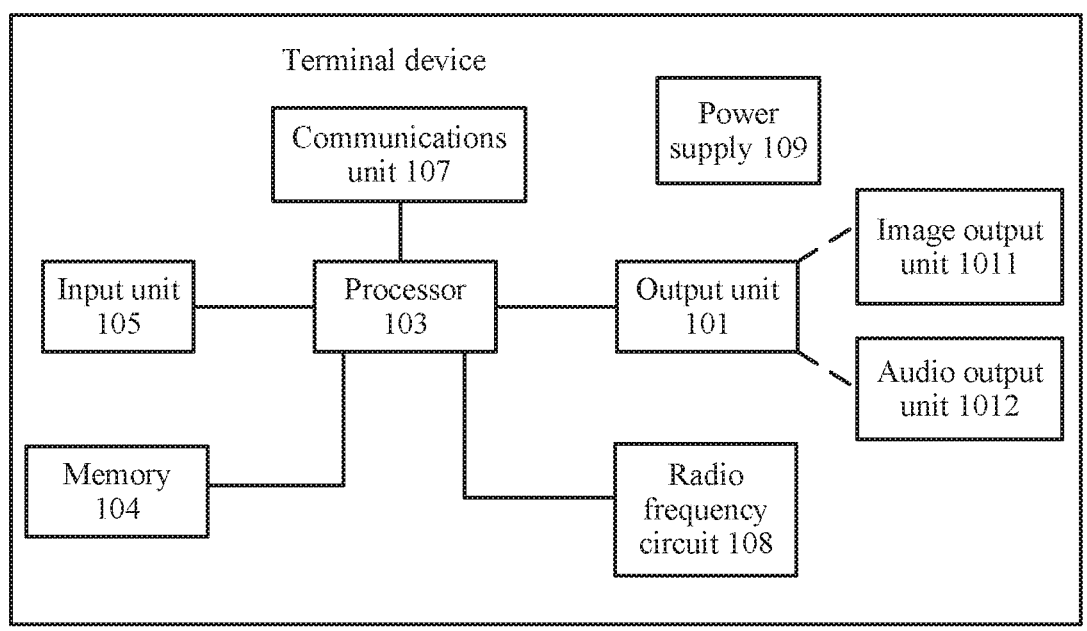
FIG. 1 is a schematic structural diagram of an embodiment of a terminal device according to the present invention.

With reference to FIG. 1, the following describes a specific structure of the terminal device shown in this embodiment. FIG. 1 is a schematic structural diagram of an embodiment of the terminal device according to the present invention.

The terminal device includes components such as an input unit 105, a processor 103, an output unit 101, a communications unit 107, a memory 104, and a radio frequency circuit 108.

The components perform communication by using one or more buses. Persons skilled in the art may understand that, the structure of the terminal device shown in FIG. 1 does not constitute a limitation on the present invention. The structure may be a bus structure, or may be a star structure. Further, a quantity of parts included may be greater or less than that shown in the figure, or some parts are combined, or arrangements of parts are different.

In an implementation of the present invention, the terminal device may be any mobile or portable electronic device, including but not limited to a smartphone, a mobile computer, a tablet computer, a personal digital assistant (Personal Digital Assistant, PDA), an electronic watch, an electronic band, a media player, a smart television, or the like.

The terminal device includes:

The output unit 101 is configured to output a to-be-displayed image.

Specifically, the output unit 101 includes but is not limited to an image output unit 1011 and an audio output unit 1012.

The image output unit 1011 is configured to output a text, an image, and/or a video. The image output unit 1011 may include a display panel, for example, a display panel configured in a form of a liquid crystal display (English full name: Liquid Crystal Display, LCD for short), an organic light-emitting diode (English full name: Organic Light-Emitting Diode, OLED for short), or a field emission display (English full name: field emission display, FED for short). Alternatively, the image output unit 1011 may include a reflective display, for example, an electrophoretic (electrophoretic) display, or a display using an interferometric modulation of light (Interferometric Modulation of Light) technology.

The image output unit 1011 may include a single display or a plurality of displays of different sizes. In a specific implementation of the present invention, a touchscreen may also be used as a display panel of the output unit 101.

For example, after the touchscreen detects a touch on the touchscreen or a gesture operation near the touchscreen, the touchscreen transmits the touch or gesture operation to the processor 103 to determine a type of a touch event. Then the processor 103 provides a corresponding visual output on the display panel based on the type of the touch event. Although the input unit 105 and the output unit 101 are used as two independent parts for implementing input and output functions of the terminal device in FIG. 1, in some embodiments, the touchscreen and the display panel may be integrated for implementing the input and output functions of the terminal device. For example, the image output unit 1011 may display various graphical user interfaces (English full name: Graphical User Interface, GUI for short) used as virtual control components, including but not limited to a window, a scroll bar, an icon, and a clipboard, so that a user performs an operation in a touch manner.

In a specific implementation of the present invention, the image output unit 1011 includes a filter and an amplifier, configured to filter and amplify a video output by the processor 103. The audio output unit 1012 includes a digital-to-analog converter, configured to convert an audio signal output by the processor 103 from a digital format to an analog format.

The processor 103 is configured to run corresponding code, and process received information to generate and output a corresponding interface.

Specifically, the processor 103 is a control center of the terminal device. The processor 103 uses various interfaces and lines to connect each part of the whole terminal device, and by running or executing a software program and/or module stored in the memory, and invoking data stored in the memory, executes various functions and/or data processing of the terminal device. The processor 103 may include an integrated circuit (English full name: Integrated Circuit, IC for short), for example, may include a single packaged IC, or may include a plurality of interconnected packaged ICs that have a same function or different functions. For example, the processor 103 may include only a central processing unit (English full name: Central Processing Unit, CPU for short), or may be a combination of a graphics processing unit (English full name: Graphics Processing Unit, GPU for short), a digital signal processor (English full name: Digital Signal Processor, DSP for short), and a control chip (for example, a baseband chip) in a communications unit. In an implementation of the present invention, the CPU may be a single operation core, or may include a plurality of operation cores.

The memory 104 is configured to store the code and data, and the code is run by the processor 103.

Specifically, the memory 104 may be configured to store the software program and module. The processor 103 executes various function applications and data processing of the terminal device by running the software program and module stored in the memory 104. The memory 104 mainly includes a program storage area and a data storage area. The program storage area may store an operating system, and an application program required by at least one function, such as an audio playing program or an image playing program.

The data storage area may store data (such as audio data or a phone book) that is created based on use of the terminal device, or the like.

In a specific implementation of the present invention, the memory 104 may include a volatile memory, for example, a nonvolatile dynamic random access memory (English full name: Nonvolatile Random Access Memory, NVRAM for short), a phase change random access memory (English full name: Phase Change RAM, PRAM for short), or a magnetoresistive random access memory (English full name: Magnetoresistive RAM, MRAM for short), and may further include a nonvolatile memory, for example, at least one disk storage device, an electrically erasable programmable read-only memory (English full name: Electrically Erasable Programmable Read-Only Memory, EEPROM for short), or a flash memory such as a NOR flash memory (English full name: NOR flash memory) or a NAND flash memory (English full name: NAND flash memory).

The nonvolatile memory stores the operating system and the application program executed by the processor 103. The processor 103 loads the running program and data from the nonvolatile memory to the memory and stores digital content in a mass storage apparatus. The operating system includes various components and/or drivers that are configured to control and manage routine system tasks, for example, memory management, storage device control, power management, and the like, and are helpful for communication between software and hardware.

In an implementation of the present invention, the operating system may be an Android system of Google Inc., an iOS system developed by Apple Inc., a Windows operating system developed by Microsoft Corporation, or the like, or is an embedded operating system like Vxworks.

The application program includes any application installed on the terminal device, including but not limited to a browser, email, instant messaging service, text processing, keyboard virtualization, widget (Widget), encryption, digital rights management, speech recognition, speech replication, positioning (for example, a function provided by a global positioning system), music playing, or the like.

The input unit 105 is configured to implement an interaction between the user and the terminal device and/or an information input to the terminal device.

For example, the input unit 105 may receive numeral or character information input by the user, to generate a signal input related to a user setting or function control. In a specific implementation of the present invention, the input unit 105 may be a touchscreen, or may be another human-machine interaction interface, for example, a physical input key or a microphone, or may be another external information acquisition apparatus such as a camera.

The touchscreen shown in this embodiment of the present invention may capture a touch of the user on the touchscreen or an operation action near the touchscreen. For example, the user performs an operation action on the touchscreen or in a position near the touchscreen by using any appropriate object or accessory such as a finger or a stylus, and drives a corresponding connection apparatus based on a preset program. Optionally, the touchscreen may include two parts: a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and sends the touch point coordinates to the processor 103.

The touch controller may further receive and execute a command sent by the processor 103. In addition, the touchscreen may be implemented by using a plurality of types such as resistive, capacitive, infrared, and surface acoustic wave.

In another implementation of the present invention, the physical input key used by the input unit 105 may include but is not limited to one or more of a physical keyboard, a function key (such as a volume control key or a power on/off key), a trackball, a mouse, a joystick, and the like. The input unit 105 in a microphone form may capture a speech input by the user or an environment, and convert the speech into a command that is in an electrical signal form and can be executed by the processor 103.

in other implementations of the present invention, the input unit 105 may also be various sensors, for example, a Hall component configured to sense a physical quantity of the terminal device, for example, force, torque, pressure, stress, location, displacement, speed, acceleration, angle, angular velocity, revolutions, rotational speed, or time at which a working status changes, and convert the physical quantity into power to perform detection and control. Other sensors may further include a gravity sensor, a tri-axis accelerometer, a gyroscope, an electronic compass, an ambient light sensor, a proximity sensor, a temperature sensor, a humidity sensor, a heart rate sensor, a fingerprint recognizer, and the like.

The communications unit 107 is configured to establish a communications channel, so that the terminal device connects to a remote server by using the communications channel and downloads media data from the remote server. The communications unit 107 may include a communications module such as a wireless local area network (English full name: Wireless Local Area Network, wireless LAN for short) module, a Bluetooth module, or a baseband module, and a radio frequency (English full name: Radio Frequency, RF for short) circuit corresponding to the communications module, and is configured to perform wireless local area network communication, Bluetooth communication, infrared communication, and/or communication in a cellular communications system, for example, Wideband Code Division Multiple Access (English full name: Wideband Code Division Multiple Access, WCDMA for short), and/or High Speed Downlink Packet Access (English full name: High Speed Downlink Packet Access, HSDPA for short). The communications module is configured to control communication of each component in the terminal device, and may support direct memory access.

In different implementations of the present invention, each communications module in the communications unit 107 generally exists in a form of an integrated circuit chip (English full name: Integrated Circuit Chip), and a combination of the communications modules may be selected, without necessarily including all communications modules and corresponding antenna groups. For example, the communications unit 107 may include only a baseband chip, a radio frequency chip, and a corresponding antenna to provide a communications function in a cellular communications system. For a wireless communications connection established by using the communications unit 107, for example, wireless local area network access or WCDMA access, the terminal device may connect to a cellular network (English full name: Cellular Network) or the Internet. In some optional implementations of the present invention, the communications module in the communications unit 107, for example, the baseband module, may be integrated in the processor 103, typically, for example, an APQ+MDM series platform provided by Qualcomm Incorporated (Qualcomm).

The radio frequency circuit 108 is configured to receive or transmit information, or receive or transmit a signal in a call process. For example, after receiving downlink information from a base station, the radio frequency circuit 108 transmits the downlink information to the processors 103 for processing, and in addition, transmits designed uplink data to the base station. Generally, the radio frequency circuit 108 includes well-known circuits for executing these functions, including but not limited to an antenna system, a radio frequency transceiver, one or more amplifiers, a tuner, one or more oscillators, a digital signal processor, a codec (Codec) chipset, a subscriber identity module (SIM), a memory, and the like. In addition, the radio frequency circuit 108 may further communicate with a network and another device through wireless communication.

The wireless communication may use any communications standard or protocol, including but not limited to the Global System for Mobile Communications (English full name: Global System of Mobile communication, GSM for short), General Packet Radio Service (General Packet Radio Service, GPRS for short), Code Division Multiple Access (English full name: Code Division Multiple Access, CDMA for short), Wideband Code Division Multiple Access (English full name: Wideband Code Division Multiple Access, WCDMA for short), High Speed Uplink Packet Access (English full name: High Speed Uplink Packet Access, HSUPA for short) technology, Long Term Evolution (English full name: Long Term Evolution, LTE for short), email, short message service (English full name: Short Messaging Service, SMS for short), or the like.

A power supply 109 is configured to supply power to different components of the terminal device to keep the components running. A general understanding is that the power supply 109 may be a built-in battery, for example, a common lithium-ion battery or a common NiMH battery, and also includes an external power supply directly supplying power to the terminal device, for example, an AC adapter. In some implementations of the present invention, the power supply 109 may be further defined more extensively, for example, may further include a power management system, a recharge system, a power failure detection circuit, a power converter or inverter, and a power status indicator (such as a light-emitting diode), and any other component associated with electric energy generation, management, and distribution in the terminal device.

Figure 2A:
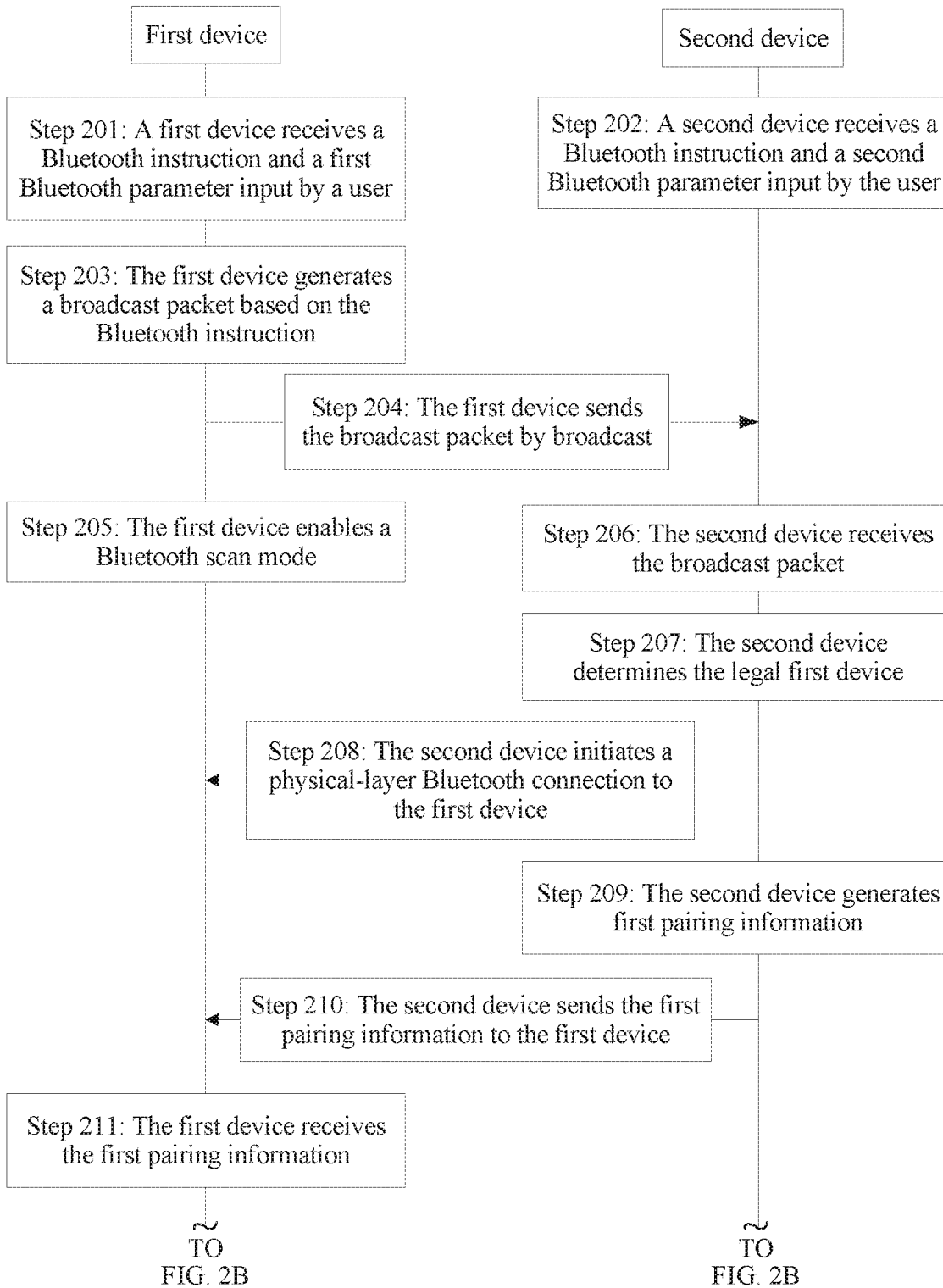
FIG. 2A and FIG. 2B are a flowchart of steps in an embodiment of Bluetooth pairing method according to the present invention.
Figure 2B:
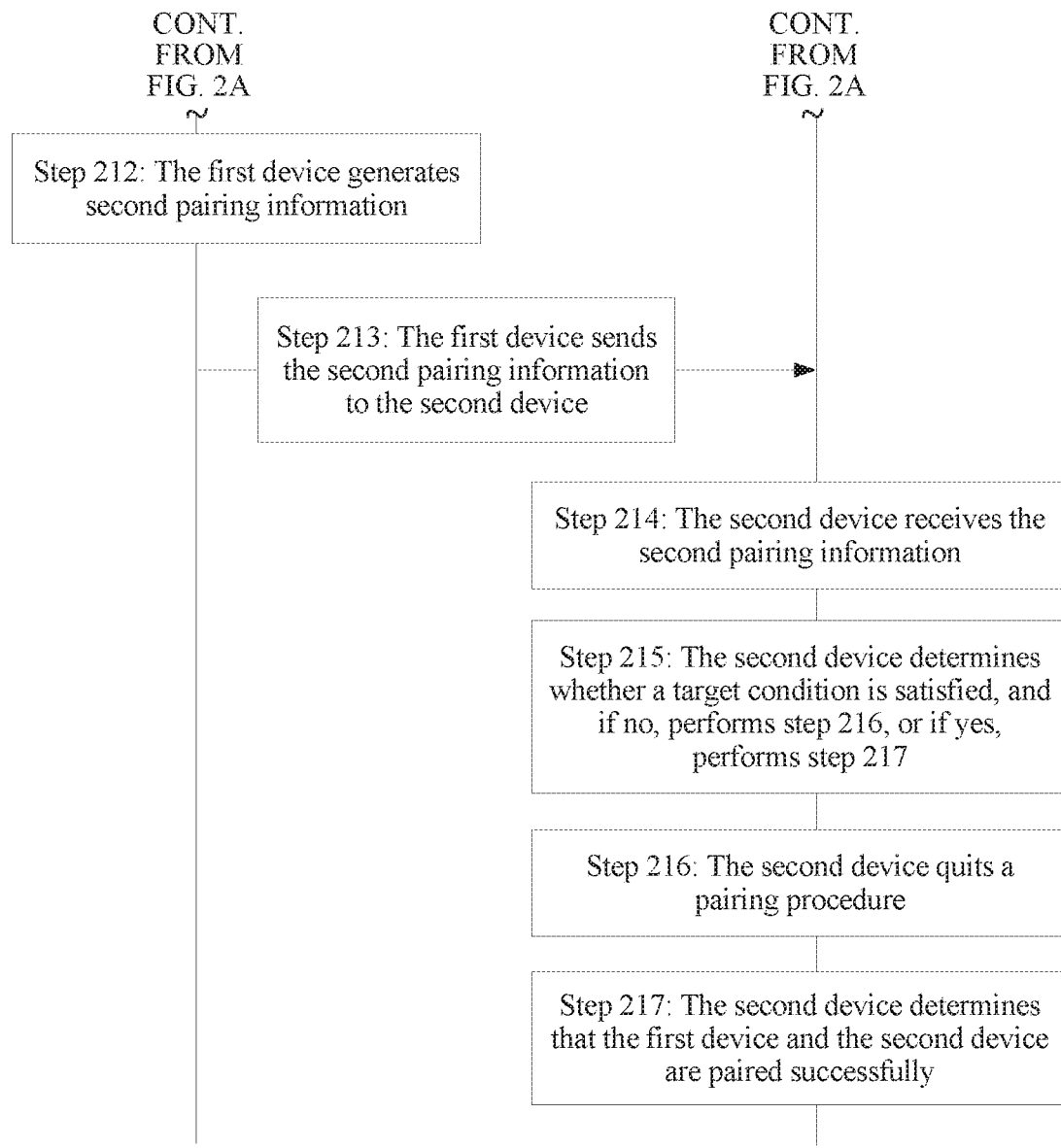

With reference to FIG. 2A and FIG. 2B, the following describes a Bluetooth pairing method provided by this embodiment. According to a procedure shown in FIG. 2A and FIG. 2B, Bluetooth pairing can be implemented between a terminal device and a peer device.

In a Bluetooth technology, when a physical-layer Bluetooth connection is established between two devices, one device plays a master role (namely, a master device), and the other device plays a slave role (namely, a slave device). After Bluetooth pairing is performed between the master device and the slave device, data communication can be performed between the master device and the slave device.

For better understanding this embodiment of the present invention, this embodiment of the present invention is described by using an example in which the master device is a second device and the slave device is a first device.

It should be clear that, the description about the first device and the second device in this embodiment is an optional example, and is not limited. In other embodiments, the first device may also be a master device in Bluetooth pairing, and the second device may also be a slave device in Bluetooth pairing.

FIG. 2A and FIG. 2B are a flowchart of steps in an embodiment of a Bluetooth pairing method according to the present invention.

Step 201: A first device receives a Bluetooth instruction and a first Bluetooth parameter input by a user.

Step 202: A second device receives a Bluetooth instruction and a second Bluetooth parameter input by the user.

The following describes step 201 and step 202 in detail.

Specifically, the Bluetooth technology specifies that after a Bluetooth pairing relationship is successfully established between the second device and the first device, the second device and the first device can receive data from and transmit data to each other.

In this embodiment, the user may input the Bluetooth instruction and the Bluetooth parameter to the second device and the first device simultaneously by using a voice. In this case, the first device may determine that the received Bluetooth parameter is the first Bluetooth parameter, and the second device may determine that the received Bluetooth parameter is the second Bluetooth parameter.

It should be clear that, the terms "first" and "second" in the first Bluetooth parameter and the second Bluetooth parameter in this embodiment are used merely for distinguishing different terminals that receive the Bluetooth parameter. The terms "first" and "second" shown in this embodiment are not limited in the protection scope. In other embodiments, the Bluetooth parameter received by the second device may be the first Bluetooth parameter, and the Bluetooth parameter received by the first device may be the second Bluetooth parameter.

For another example, the user may input the Bluetooth instruction and the Bluetooth parameter to the second device and the first device separately by using a voice. For example, the user may input the Bluetooth instruction and the second Bluetooth parameter to the second device by using a keyboard, a touchscreen, or the like, and the user inputs the Bluetooth instruction and the first Bluetooth parameter to the first device by using a voice.

Obviously, in this embodiment, a specific manner of receiving the Bluetooth instruction and the Bluetooth parameter by the second device and the first device is not limited, as long as the second device can establish Bluetooth pairing with the first device in the Bluetooth pairing process. In this case, the user inputs the same Bluetooth instruction to the second device and the first device, and the user inputs the first Bluetooth parameter and the second Bluetooth parameter that are the same.

This embodiment is described by using an example in which the user inputs the Bluetooth instruction and the Bluetooth parameter to the second device and the first device simultaneously by using a voice.

The second device and the first device shown in this embodiment can implement a voice interaction technology, so that the second device and the first device can receive, by using the voice interaction technology, the Bluetooth instruction and the Bluetooth parameter input by the user.

Currently, technology companies including Google and Apple are striving to develop the voice interaction technology. For example, Google provides Google Now Google Now in an Android Android system, and Apple provides an Apple voice assistant Siri in an Apple iOS system, both of which are used to perform a voice interaction between a human and a device.

When the user needs to input a voice instruction by using a voice, the second device and the first device need to be controlled to be in a speech recognition state.

Specifically, assuming that the first device is a smart watch, and that Google Now is used on the current smart watch, the user only needs to say "Hello, Android" to the watch. A smart watch system may invoke speech recognition software, and the user may send a voice instruction to input the Bluetooth instruction and the first Bluetooth parameter.

Assuming that the second device is a smartphone, when the mobile phone is in an unlocked screen-on state, a Home key of the mobile phone may be touched and held to invoke speech recognition software of the mobile phone; and the user may send a voice instruction to input the Bluetooth instruction and the second Bluetooth parameter.

It should be clear that, the description about the manner of controlling the second device and the first device to be in the speech recognition state in this embodiment is an optional example, and is not limited, as long as the user can input the Bluetooth instruction and the Bluetooth parameter.

Specifically, the Bluetooth instruction shown in this embodiment is a speech including first target content, and the first target content may be "Bluetooth pairing". In a specific application, the first target content may also be other content, for example. "pairing" or "connection", as long as the second device and the first device determine, based on the Bluetooth instruction input by the user, that a Bluetooth pairing procedure needs to be performed in this embodiment.

The Bluetooth parameter shown in this embodiment may be a speech that is input by the user by using a voice and includes second target content, the second target content may be any character input by the user by using a voice, and the character may be a character in any language such as a Chinese character or an English character, or the character may be a numeric character.

For example, the Chinese character included in the second target content may be a name of a person, a name of a place, a name of a shop, or the like. The numeric character may be any number, for example, "1234567" or "7648465".

It should be clear that, content and a length included in the Bluetooth parameter are not limited in this embodiment.

Optionally, the second device and the first device in this embodiment may preprocess the Bluetooth parameter.

Specifically, after receiving the Bluetooth parameter input by the user, the second device and the first device shown in this embodiment may encode the Bluetooth parameter to generate an encoded Bluetooth parameter.

More specifically, if the second target content input by the user is a Chinese character, for example, a name of a person "Liu Dehua", the second device and the first device may encode the name of the person input by the user.

The following describes a specific encoding mode.

The second device and the first device may pre-create a same code list, and correspondences between different characters and different codes are established in the code list.

In this application scenario, correspondences between different Chinese characters and different codes are established in the code list.

In this embodiment, the code list created by the second device and the first device may be shown in Table 1. It should be clear that, a form of the code list in this embodiment is an optional example, and is not limited. In a specific application, the second device and the first device may also create code lists of other forms, as long as the code lists created by the second device and the first device are the same code list, and therefore, a code corresponding to the Bluetooth parameter can be obtained based on the code list.

TABLE 1

| User input | Code |
|---|---|
| Liu | 1234 |
| De | 5678 |
| hua | 9011 |
| Xi' | 1111 |
| an | 2222 |
| . . . | . . . |

Obviously, based on the code list created in Table 1, an encoded Bluetooth parameter corresponding to the Bluetooth parameter "Liu Dehua" input by the user by using a voice is "123456789011".

If the Bluetooth parameter input by the user is a number, the Bluetooth parameter does not need to be encoded.

It should be clear that, the mode of encoding the Bluetooth parameter input by the user by using the code list shown in this embodiment is an optional example, and is not limited.

The preprocessing shown in this embodiment may further include:

using the first device as an example, the first device determines whether a quantity of characters included in the received first Bluetooth parameter is greater than or equal to a preset quantity; and if the quantity of characters included in the received first Bluetooth parameter is greater than or equal to the preset quantity, the first device needs to modify the first Bluetooth parameter based on a preprocessing method.

The preprocessing method may be: the first device selects, from all characters included in the first Bluetooth parameter, the preset quantity of characters as a modified first Bluetooth parameter.

For example, if the preset quantity is three characters, but the first Bluetooth parameter input by the user includes 20 Chinese characters, the first device may select any three Chinese characters from the 20 Chinese characters included in the first Bluetooth parameter. For example, the first device may select Chinese characters arranged in first three positions from the 20 Chinese characters included in the first Bluetooth parameter. For another example, the first device may select Chinese characters arranged in last three positions from the 20 Chinese characters included in the first Bluetooth parameter.

The description about the preset quantity in this embodiment is an optional example, and is not limited.

If the quantity of characters included in the first Bluetooth parameter is less than the preset quantity, the first device may supplement the first Bluetooth parameter input by the user, so that a quantity of characters included in a supplemented first Bluetooth parameter is equal to the preset quantity.

For example, if the preset quantity is three characters, but the first Bluetooth parameter input by the user includes one Chinese character, the first device may supplement, by using any character, the first Bluetooth parameter input by the user, so that a quantity of characters included in a supplemented first Bluetooth parameter is equal to 3. In this embodiment, a specific character used for supplementation and a supplementation manner are not limited, as long as the quantity of characters included in the supplemented Bluetooth parameter is equal to the preset quantity.

For a manner of modifying the second Bluetooth parameter by the second device, refer to the manner of modifying the first Bluetooth parameter by the first device based on the preprocessing method. Details are not further described.

Step 203: The first device generates a broadcast packet based on the Bluetooth instruction.

The broadcast packet shown in this embodiment is used to establish a physical-layer Bluetooth connection between the first device and the second device.

The following describes a specific process of generating the broadcast packet shown in this embodiment.

Optionally, the first device may generate the broadcast packet based on a first preset mode.

The first preset mode may be as follows:

The first device generates a first random number based on the Bluetooth instruction.

The first random number is any random number generated by the first device, and a quantity of numeric characters included in the first random number is not limited in this embodiment.

For example, the first random number may be "25798623789".

The first device sets the first random number as a Bluetooth name of the first device.

After randomly generating the first random number, the first device shown in this embodiment may set the first random number as the Bluetooth name of the first device.

The first device sets the first random number in the broadcast packet.

Optionally, the first device sets the first random number in a vendor field in the broadcast packet.

In the first preset mode, the broadcast packet includes the first random number.

Further optionally, the first device may generate the broadcast packet based on a second preset mode.

The second preset mode may be as follows:

The first device generates a first random number based on the Bluetooth instruction.

The first device sets the first random number as a Bluetooth name of the first device.

For details, refer to the detailed description about the first preset mode. The second preset mode is not further described.

The first device further generates a second random number based on the Bluetooth instruction.

The second random number shown in this embodiment is generated by the first device randomly, and the second random number is not limited in this embodiment.

The first device performs computation on the first random number and the second random number based on a first algorithm to generate first verification data.

The first algorithm shown in this embodiment may be a DES (Data Encryption Standard, data encryption standard) or an IDEA (International Data Encryption Algorithm, international data encryption algorithm).

The first algorithm is not limited in this embodiment, as long as the first device and the second device pre-agree upon the same first algorithm.

The first device sets the first verification data in the broadcast packet.

In the second preset mode, the broadcast packet includes the first random number, the second random number, and the first verification data.

Further optionally, the first device may generate the broadcast packet based on a third preset mode.

The first device generates a first random number and a second random number based on the Bluetooth instruction.

The first random number and the second random number are data randomly generated by the first device.

The first device performs computation on the first random number and the second random number based on a second algorithm to generate second verification data.

The second algorithm is not limited in this embodiment, as long as the first device and the second device pre-agree upon the same second algorithm.

In the third preset mode, the broadcast packet includes the first random number, the second random number, and the second verification data.

Step 204: The first device sends the broadcast packet by broadcast.

The broadcast packet shown in this step may be a broadcast packet sent by a Bluetooth low energy (English full name: Bluetooth Low Enemy, BLE for short) device, or may be a conventional Bluetooth scan response (English full name: Scan response) packet. The description about the broadcast packet in this embodiment is an optional example, and is not limited.

It should be clear that, the description about the broadcast packet in this embodiment is an optional example, and is not specifically limited in this embodiment.

Step 205: The first device enables a Bluetooth scan mode.

The first device shown in this embodiment enables the Bluetooth scan mode. Therefore, the first device that has enabled the Bluetooth scan mode can be scanned by the second device, and the first device in a Bluetooth scan mode enabled state can receive physical-layer Bluetooth connection request information sent by the second device.

Specifically, for Bluetooth low energy, that the first device enables the Bluetooth scan mode means starting broadcasting, and responding to a scan request or a connection request of the second device, and for conventional Bluetooth, it means responding to an external scan request or connection request.

In this embodiment, a time sequence of performing step 204 and step 205 is not limited. Optionally, step 205 shown in this embodiment may be performed when step 204 is performed.

Step 206: The second device receives the broadcast packet.

In this embodiment, the second device can scan nearby Bluetooth devices and therefore obtain broadcast packets of the nearby Bluetooth devices.

Step 207: The second device determines the legal first device.

In this embodiment, the second device verifies the broadcast packet to determine the legal first device.

The following describes how the second device shown in this embodiment specifically determines the legal first device based on the broadcast packet.

One manner is as follows:

In this manner, the broadcast packet received by the second device is the packet generated by the first device based on the first preset mode. In this case, the broadcast packet includes the first random number sent by the first device.

In this manner, the second device can generate a Bluetooth list in the process of scanning the nearby Bluetooth devices, and a name of a scanned Bluetooth device is set in the Bluetooth list.

The Bluetooth list generated by the second device shown in this embodiment includes at least the Bluetooth name of the first device.

If the second device determines that the broadcast packet satisfies a first preset condition, the second device may determine that the first device satisfying the first preset condition is a legal device.

The first preset condition is that the Bluetooth name of the first device scanned by the second device is the same as the first random number included in the broadcast packet.

Another manner is as follows:

In this manner, the broadcast packet received by the second device is the packet generated by the first device based on the second preset mode. In this case, the broadcast packet may include the first random number, the second random number, and the first verification data.

In this embodiment, the second device may prestore a third algorithm.

Specifically, when the second device determines that the broadcast packet satisfies a second preset condition, the second device may determine that the first device satisfying the second preset condition is a legal device.

In this manner, after receiving the broadcast packet, the second device first performs, based on the prestored third algorithm, computation on the first random number and the second random number included in the broadcast packet to generate third verification data.

The second preset condition is that the Bluetooth name of the first device scanned by the second device is the same as the first random number included in the first verification data.

The second preset condition is further that the third verification data computed by the second device is the same as the first verification data included in the broadcast packet received by the second device.

Specifically, if the third verification data is the same as the first verification data, it indicates that the third algorithm stored by the second device and the first algorithm stored by the first device are the same algorithm. It indicates that the second device and the first device have pre-agreed upon the algorithm, so that the third algorithm stored by the second device and the first algorithm stored by the first device are the same algorithm.

Another manner is as follows:

In this manner, the broadcast packet received by the second device is the packet generated by the first device based on the third preset mode. In this case, the broadcast packet may include the first random number, the second random number, and the second verification data.

When the second device determines that the broadcast packet satisfies a third preset condition, the second device may determine that the first device satisfying the third preset condition is a legal device.

In this manner, after receiving the broadcast packet, the second device first performs, based on a fourth algorithm prestored by the second device, computation on the first random number and the second random number to generate fourth verification data.

The third preset condition is that the fourth verification data obtained by the second device through computation and the second verification data included in the broadcast packet are the same data.

Specifically, if the fourth verification data is the same as the second verification data, it indicates that the fourth algorithm stored by the second device and the second algorithm stored by the first device are the same algorithm. It indicates that the second device and the first device have pre-agreed upon the algorithm, so that the fourth algorithm stored by the second device and the second algorithm stored by the first device are the same algorithm.

In this embodiment, after the second device determines the legal first device, the second device may trigger a step of initiating a physical-layer Bluetooth connection to the first device.

Optionally, in this embodiment, the second device may perform timing when receiving the second Bluetooth parameter input by the user. When a timing duration exceeds a preset time, if the legal first device is not authenticated by the second device, the second device may prompt the user to input the Bluetooth instruction and the first Bluetooth parameter to the first device again.

Specifically, the second device may prompt, in a voice manner, the user to input the Bluetooth instruction and the first Bluetooth parameter to the first device, or the second device prompts, by using prompt information displayed on a display screen, the user to input the Bluetooth instruction and the first Bluetooth parameter to the first device again.

Optionally, the second device may store a target quantity of times that the legal first device is not authenticated by the second device. If the target quantity of times is greater than or equal to a preset threshold, the second device may prompt the user that no legal first device is found.

Optionally, after the second device authenticates the legal first device, the second device may prompt the user that the second device has authenticated the legal first device.

It should be clear that, the description about the second device determining the legal first device in this embodiment is an optional example, and is not limited.

It should also be clear that, step 203 to step 207 shown in this embodiment are optional steps. In a specific application, the process of determining the legal first device shown in step 203 to step 207 shown in this embodiment may also not be performed, that is, the second device may also initiate a physical-layer Bluetooth connection to all scanned first devices one by one until the second device determines a first device that is paired successfully.

Step 208: The second device initiates a physical-layer Bluetooth connection to the first device.

After the second device determines the legal first device, the second device may initiate the physical-layer Bluetooth connection to the legal first device.

Specifically, the second device may send a physical-layer Bluetooth connection request message to the first device; after receiving the physical-layer Bluetooth connection request information, the first device returns a physical-layer Bluetooth connection response message to the second device; and when the second device receives the physical-layer Bluetooth connection response message sent by the first device, the physical-layer Bluetooth connection is successfully established between the second device and the first device. The process of initiating the physical-layer Bluetooth connection shown in this step is a standard Bluetooth connection process, and is not described in detail herein.

It should also be clear that, step 203 to step 207 shown in this embodiment are optional steps. In a specific application, the process of determining the legal first device shown in step 203 to step 207 shown in this embodiment may also not be performed, that is, the second device may also initiate a physical-layer Bluetooth connection to all scanned first devices one by one until the second device determines a first device that is paired successfully.

Step 209: The second device generates first pairing information.

In this embodiment, the second device performs encryption processing on the second Bluetooth parameter to generate a first pairing parameter.

The following describes in detail a specific process in which the second device generates the first pairing information.

The second device generates a third random number based on the Bluetooth instruction.

Specifically, the second device may randomly generate the third random number. The third random number is not limited in this embodiment.

The second device performs computation, based on a fifth algorithm, on the second Bluetooth parameter received by the second device and the third random number to generate the first pairing parameter.

The fifth algorithm is not limited in this embodiment, as long as the second device and the first device pre-agree upon the fifth algorithm.

The description about the process of encrypting the second Bluetooth parameter in this embodiment is an optional example, and is not limited.

The first pairing information generated by the second device includes the first pairing parameter and the third random number.

Step 210: The second device sends the first pairing information to the first device.

Step 211: The first device receives the first pairing information.

Step 212: The first device generates second pairing information.

In this embodiment, the second pairing information includes a second pairing parameter and a fourth random number.

Specifically, the first device performs, based on the Bluetooth instruction, encryption processing on the first Bluetooth parameter to generate the second pairing parameter.

The following describes in detail a specific process in which the first device generates the second pairing parameter.

The first device generates the fourth random number.

In this embodiment, the first device may randomly generate the fourth random number. The fourth random number is not limited in this embodiment.

The first device performs, based on a sixth algorithm, encryption computation on the first Bluetooth parameter and the fourth random number to generate the second pairing parameter.

The sixth algorithm is not limited in this embodiment, as long as the second device and the first device pre-agree upon the sixth algorithm.

The description about the process of encrypting the first Bluetooth parameter by the first device shown in this embodiment is an optional example, and is not limited.

Step 213: The first device sends the second pairing information to the second device.

Step 214: The second device receives the second pairing information.

Specifically, the second device can parse the second pairing information, and therefore obtain the first Bluetooth parameter and the fourth random number included in the second pairing information.

A time sequence of performing step 209 to step 211 and a time sequence of performing step 212 to step 214 shown in this embodiment are not limited.

Optionally, step 209 to step 211 may be first performed, and then step 212 to step 214 are performed.

Further optionally, step 212 to step 214 may be first performed, and then step 209 to step 211 are performed.

Further optionally, step 209 to step 211 and step 212 to step 214 may be performed simultaneously.

Step 215: The second device determines whether a target condition is satisfied, and if no, performs step 216, or if yes, performs step 217.

The target condition is that the second device has determined, based on the second pairing information, that the first Bluetooth parameter is the same as the second Bluetooth parameter, and the target condition is further that the first device has determined, based on the first pairing information, that the first Bluetooth parameter is the same as the second Bluetooth parameter.

Obviously, in this embodiment, if the second device has determined, based on the second pairing information, that the first Bluetooth parameter is the same as the second Bluetooth parameter, and the first device has determined, based on the first pairing information, that the first Bluetooth parameter is the same as the second Bluetooth parameter, the second device determines that the target condition is satisfied, and performs step 217.

In this embodiment, if the second device has determined, based on the second pairing information, that the first Bluetooth parameter is different from the second Bluetooth parameter, and/or the first device has determined, based on the first pairing information, that the first Bluetooth parameter is different from the second Bluetooth parameter, the second device determines that the target condition is not satisfied, and performs step 216.

Step 216: The second device quits a pairing procedure.

In this embodiment, when the second device determines that the target condition is not satisfied, it indicates that the Bluetooth parameters received by the first device and the second device are different Bluetooth parameters, and the second device and the first device cannot establish a pairing relationship. In this case, the first device may directly quit the pairing procedure.

Step 217: The second device determines that the first device and the second device are paired successfully.

In this embodiment, when the second device determines that the target condition is satisfied, it indicates that the Bluetooth parameters received by the first device and the second device are the same Bluetooth parameter, and the second device may determine that the second device and the first device are paired successfully. The second device and the first device that have established a Bluetooth pairing relationship can exchange data.

Beneficial effects of using the Bluetooth pairing method shown in this embodiment are as follows:

In a Bluetooth pairing process shown in the prior art, a user needs to manually configure a master device and a slave device, for example, perform operations such as manually configuring Bluetooth functions of the master device and the slave device, manually setting the Bluetooth function of the slave device as visible, manually scanning the slave device, and selecting the slave device. Obviously, to implement a Bluetooth connection shown in the prior art, the user needs to perform an input operation when initiating the Bluetooth connection and during Bluetooth pairing. In comparison, in the Bluetooth pairing process shown in this embodiment, the user needs to input the Bluetooth instruction and the Bluetooth parameter only once, and then Bluetooth pairing can be automatically performed between the master device and the slave device. In the process of Bluetooth pairing between the master device and the slave device, the user does not need to perform any action.

In the process in which the master device and the slave device can automatically complete pairing, the user does not need to know Bluetooth information of the master device and the slave device, for example, the Bluetooth name of the slave device and pairing passwords of the master device and the slave device. Obviously, by using the method shown in this embodiment, a pairing operation process is simple, and the user does not need to input a pairing password manually. Therefore, a case in which Bluetooth pairing cannot be established because the user manually inputs a wrong pairing password is avoided, learning costs of the user in learning Bluetooth pairing are reduced, accuracy in the Bluetooth pairing process is improved, and usability is high.

In the method shown in this embodiment, the parameters used for performing Bluetooth pairing can be sent after being encrypted, and both the master device and the slave device need to verify the pairing parameters. The master device and the slave device can establish Bluetooth pairing only when both devices verify the pairing parameters successfully. Therefore, security of Bluetooth pairing is enhanced, and a possibility that a third party steals data exchanged between the two devices is effectively avoided.

Figure 3A:
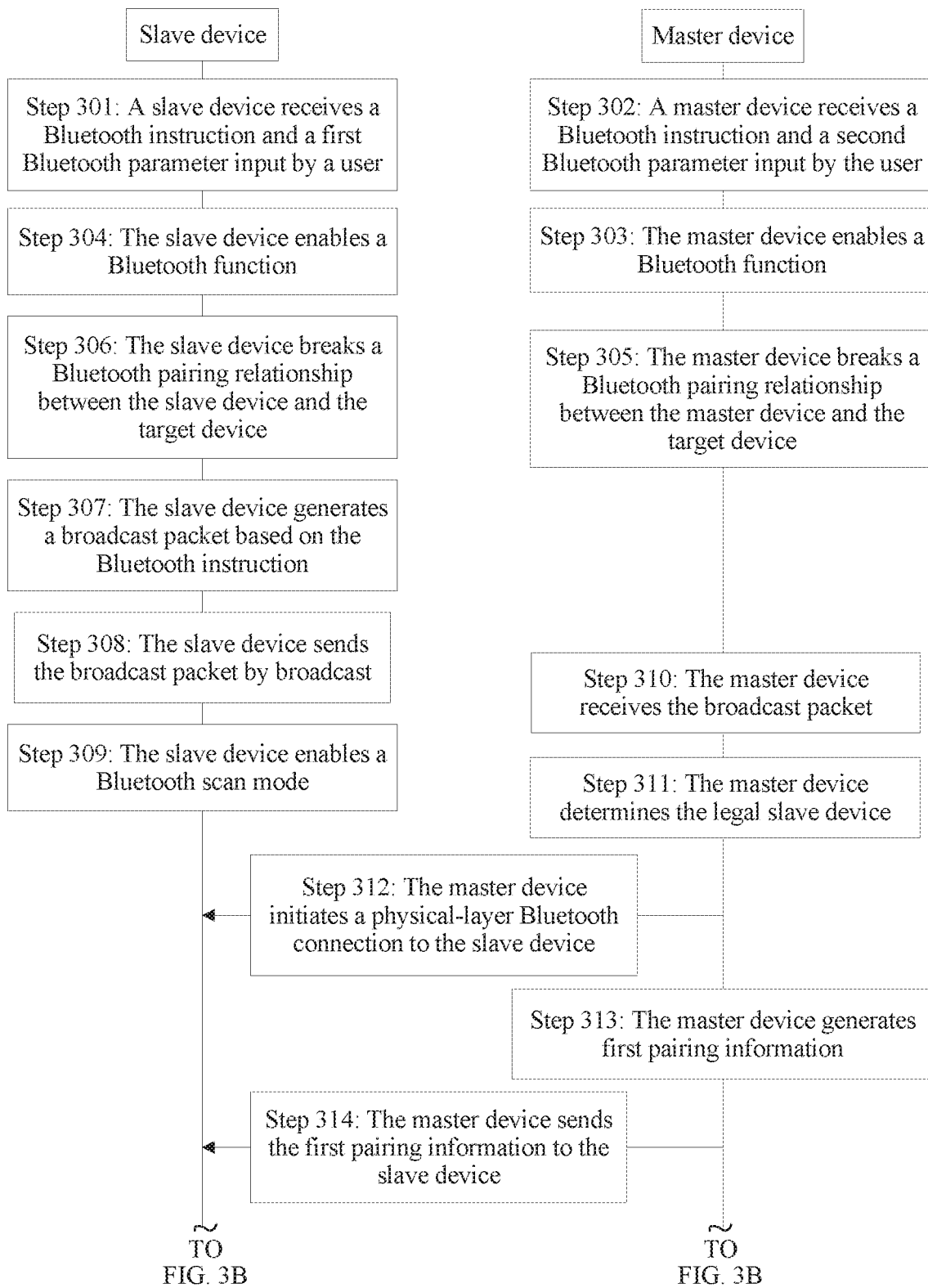
FIG. 3A and FIG. 3B are a flowchart of steps in another embodiment of a Bluetooth pairing method according to the present invention.
Figure 3B:
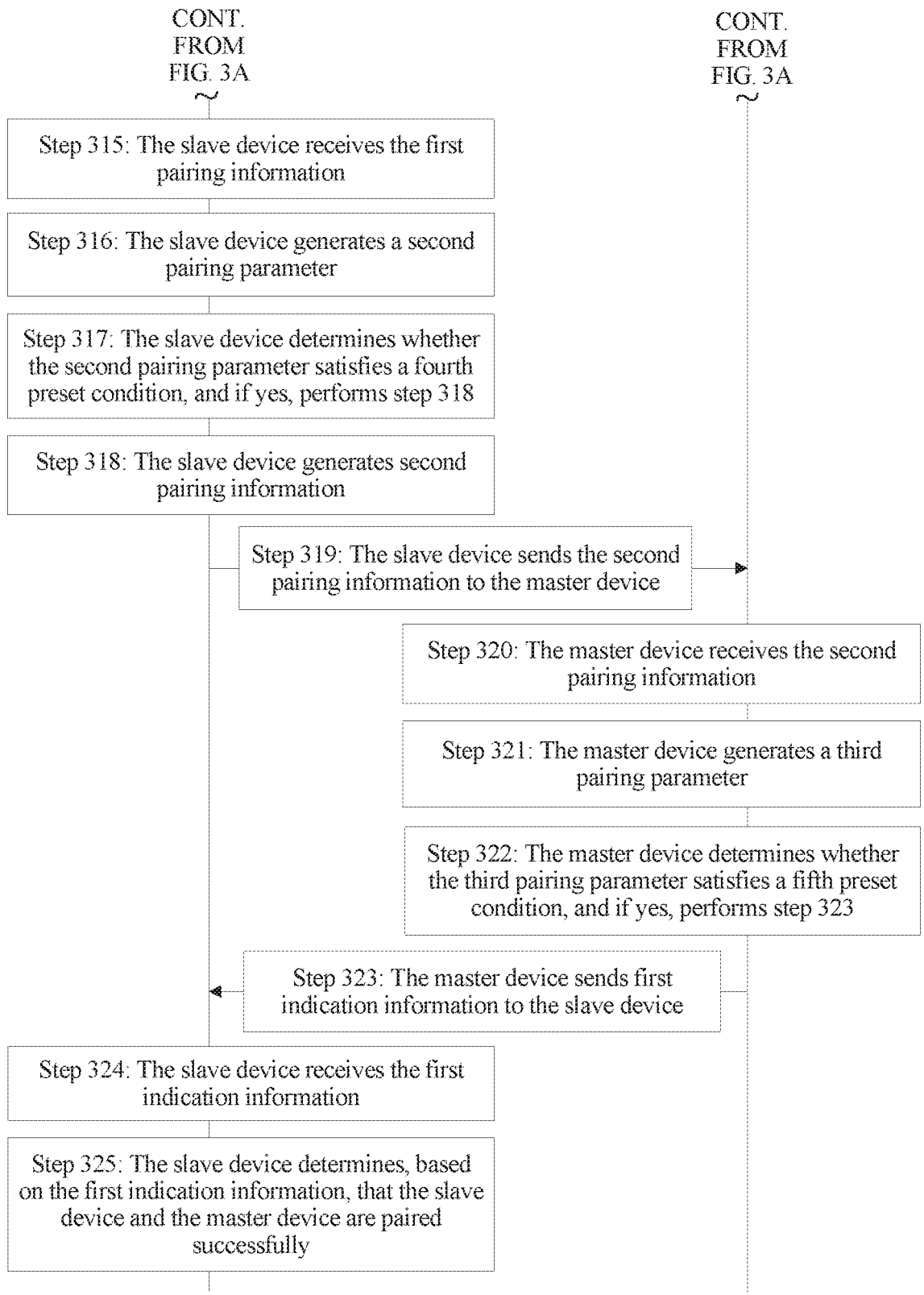

Based on the Bluetooth pairing method shown in FIG. 2A and FIG. 2B, the following describes in detail a specific Bluetooth pairing procedure with reference to FIG. 3A and FIG. 3B.

FIG. 3A and FIG. 3B are a flowchart of steps in another embodiment of a Bluetooth pairing method according to the present invention.

Step 301: A slave device receives a Bluetooth instruction and a first Bluetooth parameter input by a user.

Step 302: A master device receives a Bluetooth instruction and a second Bluetooth parameter input by the user.

For a specific process of performing step 301 and step 302 shown in this embodiment, refer to step 201 and step 202 in the embodiment shown in FIG. 2A and FIG. 2B. Details are not further described in this embodiment.

Step 303: The master device enables a Bluetooth function.

In this embodiment, if the master device detects that the Bluetooth function of the master device is in a disabled state, the master device enables the Bluetooth function of the master device.

Specifically, after the master device shown in this embodiment receives the Bluetooth instruction and the second Bluetooth parameter input by the user, the master device may automatically detect whether the Bluetooth function of the master device is in the disabled state.

For example, if the master device detects that the Bluetooth function of the master device is in the disabled state, the master device automatically enables the Bluetooth function of the master device.

Obviously, by using the method shown in this embodiment, in the process of performing Bluetooth pairing, the user does not need to set the Bluetooth function of the master device. As long as the master device detects that the user inputs the Bluetooth instruction and the second Bluetooth parameter, the master device may automatically enable the Bluetooth function of the master device. Therefore, the user does not need to manually perform an action of enabling the Bluetooth function. This enhances efficiency of the Bluetooth pairing process, reduces steps required for the user to perform the Bluetooth pairing process, and simplifies operations.

It should be clear that, the step 303 in this embodiment is an optional step. In a specific application, the Bluetooth function may also be enabled based on an input operation of the user.

Step 304: The slave device enables a Bluetooth function.

In this embodiment, if the slave device detects that the Bluetooth function of the slave device is in the disabled state, the slave device enables the Bluetooth function of the slave device.

For a specific process of enabling the Bluetooth function by the slave device shown in this embodiment, refer to step 303 in this embodiment. Details are not further described in this embodiment.

A time sequence of performing step 303 and step 304 shown in this embodiment is not limited.

It should also be clear that, the step 304 in this embodiment is an optional step. In a specific application, the Bluetooth function may also be enabled based on an input operation of the user.

Step 305: The master device breaks a Bluetooth pairing relationship between the master device and the target device.

The target device shown in this embodiment is a device that currently establishes Bluetooth pairing with the master device.

It should be clear that, step 305 shown in this embodiment is an optional step. In an actual application, whether to perform step 305 shown in this embodiment may be determined based on a specific application scenario.

In this embodiment, if the master device detects that the master device has established a Bluetooth pairing relationship between the master device and the target device, the master device breaks the Bluetooth pairing relationship between the master device and the target device.

In this embodiment, to ensure that the master device keeps a Bluetooth pairing relationship with only one device in the Bluetooth pairing process, if the master device detects that the master device is currently in Bluetooth pairing with the target device, the master device breaks the Bluetooth pairing relationship with the target device. Specifically, the master device may break a link with the target device, and delete information about the target device. A specific process of breaking Bluetooth pairing between the master device and the target device is not further described in this embodiment.

Optionally, after the master device breaks Bluetooth pairing with the target device, prompt information may also be generated. The prompt information is used to prompt the user that the master device has broken Bluetooth pairing with the target device, and the generated prompt information is pushed to a display screen, so that the user determines, based on the prompt information, that the master device has broken Bluetooth pairing with the target device.

Step 306: The slave device breaks a Bluetooth pairing relationship between the slave device and the target device.

It should be clear that, step 306 shown in this embodiment is an optional step. In an actual application, whether to perform step 306 shown in this embodiment may be determined based on a specific application scenario.

In this embodiment, if the slave device detects that the slave device has established a Bluetooth pairing relationship between the slave device and the target device, the slave device breaks the Bluetooth pairing relationship between the slave device and the target device.

For a specific process of breaking the Bluetooth pairing relationship by the slave device with the target device shown in this embodiment, refer to step 305 in this embodiment. Details are not further described in this embodiment.

A time sequence of performing step 305 and step 306 shown in this embodiment is not limited.

Step 305 and step 306 shown in this embodiment are optional steps. In a specific application, for example, if the master device may establish Bluetooth pairing relationships with a plurality of slave devices, step 305 and step 306 shown in this embodiment do not need to be performed.

Step 307: The slave device generates a broadcast packet based on the Bluetooth instruction.

Step 308: The slave device sends the broadcast packet by broadcast.

Step 309: The slave device enables a Bluetooth scan mode.

The slave device shown in this embodiment enables the Bluetooth scan mode. Therefore, the slave device that has enabled the Bluetooth scan mode can be scanned by the master device, and the slave device in a Bluetooth scan mode enabled state can receive physical-layer Bluetooth connection request information sent by the master device.

Specifically, for Bluetooth low energy, that the slave device enables the Bluetooth scan mode means starting broadcasting, and responding to a scan request or a link request of the master device, and for conventional Bluetooth, it means responding to an external scan request or connection request.

In this embodiment, a time sequence of performing step 308 and step 309 is not limited. Optionally, step 308 shown in this embodiment may be performed when step 309 is performed.

Step 310: The master device receives the broadcast packet.

In this embodiment, the master device can scan nearby Bluetooth devices and therefore obtain broadcast packets of the nearby Bluetooth devices.

Step 311: The master device determines the legal slave device.

Step 312: The master device initiates a physical-layer Bluetooth connection to the slave device.

After the master device determines the legal slave device, the master device may initiate the physical-layer Bluetooth connection to the legal slave device.

Specifically, the master device may send a physical-layer Bluetooth connection request message to the slave device; after receiving the physical-layer Bluetooth connection request information, the slave device returns a physical-layer Bluetooth connection response message to the master device; and when the master device receives the physical-layer Bluetooth connection response message sent by the slave device, the physical-layer Bluetooth connection is successfully established between the master device and the slave device. The process of initiating the physical-layer Bluetooth connection shown in this step is a standard Bluetooth connection process, and is not described in detail herein.

Step 313: The master device generates first pairing information.

In this embodiment, the master device performs encryption processing on the second Bluetooth parameter to generate a first pairing parameter.

The following describes in detail a specific process in which the master device generates the first pairing information.

The master device generates a third random number based on the Bluetooth instruction.

Specifically, the master device may randomly generate the third random number. The third random number is not limited in this embodiment.

The master device performs, based on a fifth algorithm, computation on the second Bluetooth parameter received by the master device and the third random number to generate the first pairing parameter.

The fifth algorithm is not limited in this embodiment, as long as the master device and the slave device pre-agree upon the fifth algorithm.

The description about the process of encrypting the second Bluetooth parameter in this embodiment is an optional example, and is not limited.

The first pairing information generated by the master device includes the first pairing parameter and the third random number.

Step 314: The master device sends the first pairing information to the slave device.

In this embodiment, the master device can send the first pairing information to the slave device based on the physical-layer Bluetooth connection between the master device and the slave device.

Step 315: The slave device receives the first pairing information.

Step 316: The slave device generates a second pairing parameter.

Specifically, the slave device shown in this embodiment performs, by using the fifth algorithm pre-agreed upon with the master device, computation on the third random number included in the first pairing information and the first Bluetooth parameter received by the slave device to generate the second pairing parameter.

For a specific process of performing step 307 to step 316 shown in this embodiment, refer to step 203 to step 212 in the embodiment shown in FIG. 2A and FIG. 2B. The specific execution process is not further described in this embodiment.

Step 317: The slave device determines whether the second pairing parameter satisfies a fourth preset condition, and if yes, performs step 318.

In this embodiment, the fourth preset condition is that the first pairing parameter received by the slave device is the same as the second pairing parameter obtained by the slave device through computation.

Optionally, in step 301 and step 302, the second Bluetooth parameter input by the user to the master device is "Liu Dehua", and the first Bluetooth parameter input by the user to the slave device is also "Liu Dehua", that is, the user inputs the same Bluetooth parameter to the master device and the slave device; in this case, in this step, the slave device may determine that the second pairing parameter satisfies the fourth preset condition, and trigger step 319.

Further optionally, in step 301 and step 302, the second Bluetooth parameter input by the user to the master device is "Liu Dehua", and the first Bluetooth parameter input by the user to the slave device is "Xi'an", that is, the user inputs different Bluetooth parameters to the master device and the slave device; in this case, in this step, the slave device may determine that the second pairing parameter does not satisfy the fourth preset condition, and trigger step 318.

Optionally, when establishing the physical-layer Bluetooth connection to the master device, the slave device may determine a target quantity of times that the slave device consecutively determines that the second pairing parameter does not satisfy the fourth preset condition. If the target quantity of times is greater than or equal to a preset value, the slave device may quit a pairing procedure.

The preset value is not limited in this embodiment. For example, the preset value may be 3 times.

Optionally, if the slave device determines that the second pairing parameter does not satisfy the fourth preset condition, that is, the first pairing parameter received by the slave device is different from the second pairing parameter obtained by the slave device through computation, the slave device quits the pairing procedure.

Specifically, when the slave device determines that the first Bluetooth parameter and the second Bluetooth parameter included in the first pairing information are different Bluetooth parameters, it indicates that the Bluetooth parameters received by the slave device and the master device are different Bluetooth parameters, and the master device and the slave device cannot establish a pairing relationship. In this case, the slave device may directly quit the pairing procedure.

Optionally, if the slave device determines that the second pairing parameter does not satisfy the fourth preset condition, the slave device returns to step 301.

Optionally, before the slave device quits the pairing procedure, the slave device may generate notification information, and send the notification information to the master device, where the notification information is used to notify that the master device is verified as an illegal device.

Optionally, the slave device may perform timing when establishing the physical-layer Bluetooth connection to the master device. When a timing duration exceeds a preset threshold, if the slave device has not determined the master device that can be paired, the slave device may quit the pairing procedure.

The master device that can be paired in this step is a device in which the second Bluetooth parameter sent by the master device by using the first pairing information and the first Bluetooth parameter stored by the slave device are the same parameter.

The preset threshold is not limited in this embodiment. For example, the preset threshold may be 10 minutes.

Step 318: The slave device generates second pairing information.

Step 319: The slave device sends the second pairing information to the master device.

For a specific process of performing step 318 and step 319 shown in this embodiment, refer to step 212 and step 213 in the embodiment shown in FIG. 2A and FIG. 2B. Details are not further described in this embodiment.

Step 320: The master device receives the second pairing information.

Specifically, the master device can parse the second pairing information, and therefore obtain the first Bluetooth parameter and the fourth random number included in the second pairing information.

Step 321: The master device generates a third pairing parameter.

Specifically, the master device performs, based on the sixth algorithm pre-agreed upon with the slave device, computation on the second Bluetooth parameter received by the master device and the fourth random number included in the second pairing information to generate the third pairing parameter.

Step 322: The master device determines whether the third pairing parameter satisfies a fifth preset condition, and if yes, performs step 323.

In this embodiment, the fifth preset condition is that the second pairing parameter received by the master device is the same as the third pairing parameter obtained by the master device through computation.

Optionally, in step 301 and step 302, the second Bluetooth parameter input by the user to the master device is "Liu Dehua", and the first Bluetooth parameter input by the user to the slave device is also "Liu Dehua", that is, the user inputs the same Bluetooth parameter to the master device and the slave device; in this case, in this step, the master device may determine that the third pairing parameter satisfies the fifth preset condition, and trigger step 325.

Further optionally, in step 301 and step 302, the second Bluetooth parameter input by the user to the master device is "Liu Dehua", and the first Bluetooth parameter input by the user to the slave device is "Xi'an", that is, the user inputs different Bluetooth parameters to the master device and the slave device; in this case, in this step, the master device may determine that the third pairing parameter does not satisfy the fifth preset condition, and trigger step 324.

Optionally, if the master device determines that the third pairing parameter does not satisfy the fifth preset condition, that is, the second pairing parameter received by the master device is different from the third pairing parameter obtained by the master device through computation, the master device quits the pairing procedure.

If the master device quits the pairing procedure, the master device may also send notification information used to indicate pairing recognition to the slave device, so that the master device determines, based on the notification information used to indicate pairing recognition, that pairing fails.

Optionally, if the master device determines that the third pairing parameter does not satisfy the fifth preset condition, the master device returns to step 302.

If the master device shown in this embodiment receives the second pairing information sent by the slave device in step 319, the master device may determine that the slave device has determined that the second pairing parameter satisfies the fourth preset condition, and if the master device shown in this embodiment determines that the third pairing parameter satisfies the fifth preset condition in step 322, the master device may determine the target condition. For the detailed description about the target condition, refer to step 215 shown in FIG. 2A and FIG. 2B. Details are not further described in this embodiment.

Step 323: The master device sends first indication information to the slave device.

In this embodiment, when the master device determines that the first Bluetooth parameter and the second Bluetooth parameter are the same Bluetooth parameter, the master device may generate indication information used to indicate that the master device and the slave device can establish a pairing relationship, that is, the first indication information is used to indicate that the master device has determined that the first Bluetooth parameter and the second Bluetooth parameter are the same parameter.

The master device may send the first indication information to the slave device.

Optionally, the master device shown in this embodiment may further generate an announcement or prompt information used to prompt the user that the master device and the slave device successfully establish a pairing relationship.

A specific manner in which the master device prompts the user that Bluetooth pairing is successful is not limited in this embodiment.

Step 324: The slave device receives the first indication information,

Step 325: The slave device determines, based on the first indication information, that the slave device and the master device are paired successfully.

Optionally, the first indication information shown in this embodiment is also a connection request message. The connection request message sent by the master device also indicates a connection request initiated due to successful pairing between the master device and the slave device, so that the master device and the slave device receiving the first indication information can perform a Bluetooth upper-layer service. Optionally, the master device and the slave device may also trigger a direct implementation of the Bluetooth connection by receiving the Bluetooth instruction input by the user or the like. From a perspective of the user, for example, users of the master device and the slave device input a speech of same content separately, and then after the master device and the slave device perform encryption, pairing, or the like based on the input speech, the user may directly see, from an interface display, that the master device and the slave device have completed the Bluetooth pairing or Bluetooth connection.

Optionally, after the master device and the slave device are paired successfully, the master device and the slave device prompt the user of a state that the master device and the slave device are paired successfully. A mode of displaying successful pairing is not limited in this embodiment. For example, display screens of the master device and the slave device may display prompt information used to indicate the state that the master device and the slave device are paired successfully. For another example, the master device and the slave device may push, to the user, an announcement used to indicate the state that the master device and the slave device are paired successfully. A specific prompting manner is not limited in this embodiment.

In this embodiment, when the slave device receives the first indication information sent by the master device, the slave device may determine, based on the first indication information, that the slave device and the master device are paired successfully. The master device and the slave device that have established a Bluetooth pairing relationship can exchange data.

For beneficial effects of using the Bluetooth pairing method shown in this embodiment, refer to FIG. 2A and FIG. 2B. Details are not further described in this embodiment.

Optionally, because the method shown in this embodiment is used, the master device and the slave device may automatically enable the Bluetooth function when determining that the Bluetooth function is in the disabled state. Obviously, in the process of performing Bluetooth pairing, the user does not need to set the Bluetooth function. As long as the master device and the slave device detect that the user inputs the Bluetooth instruction and the Bluetooth parameter, the master device and the slave device may automatically enable the Bluetooth function. Therefore, the user does not need to manually perform an action of enabling the Bluetooth function. This enhances efficiency of the Bluetooth pairing process, reduces steps required for the user to perform the Bluetooth pairing process, and simplifies operations.

Figure 4A:
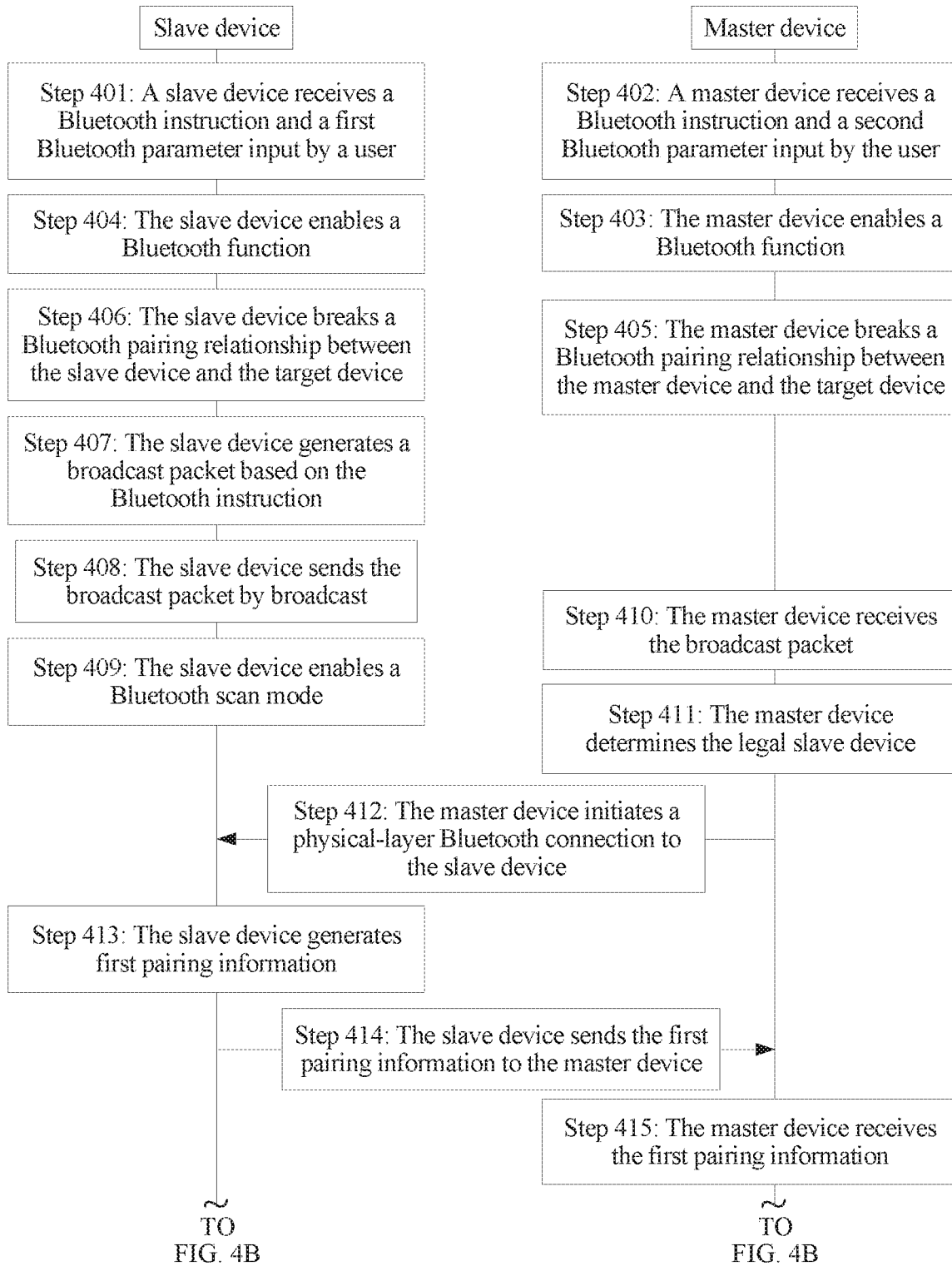
FIG. 4A and FIG. 4B are a flowchart of steps in another embodiment of a Bluetooth pairing method according to the present invention.
Figure 4B:
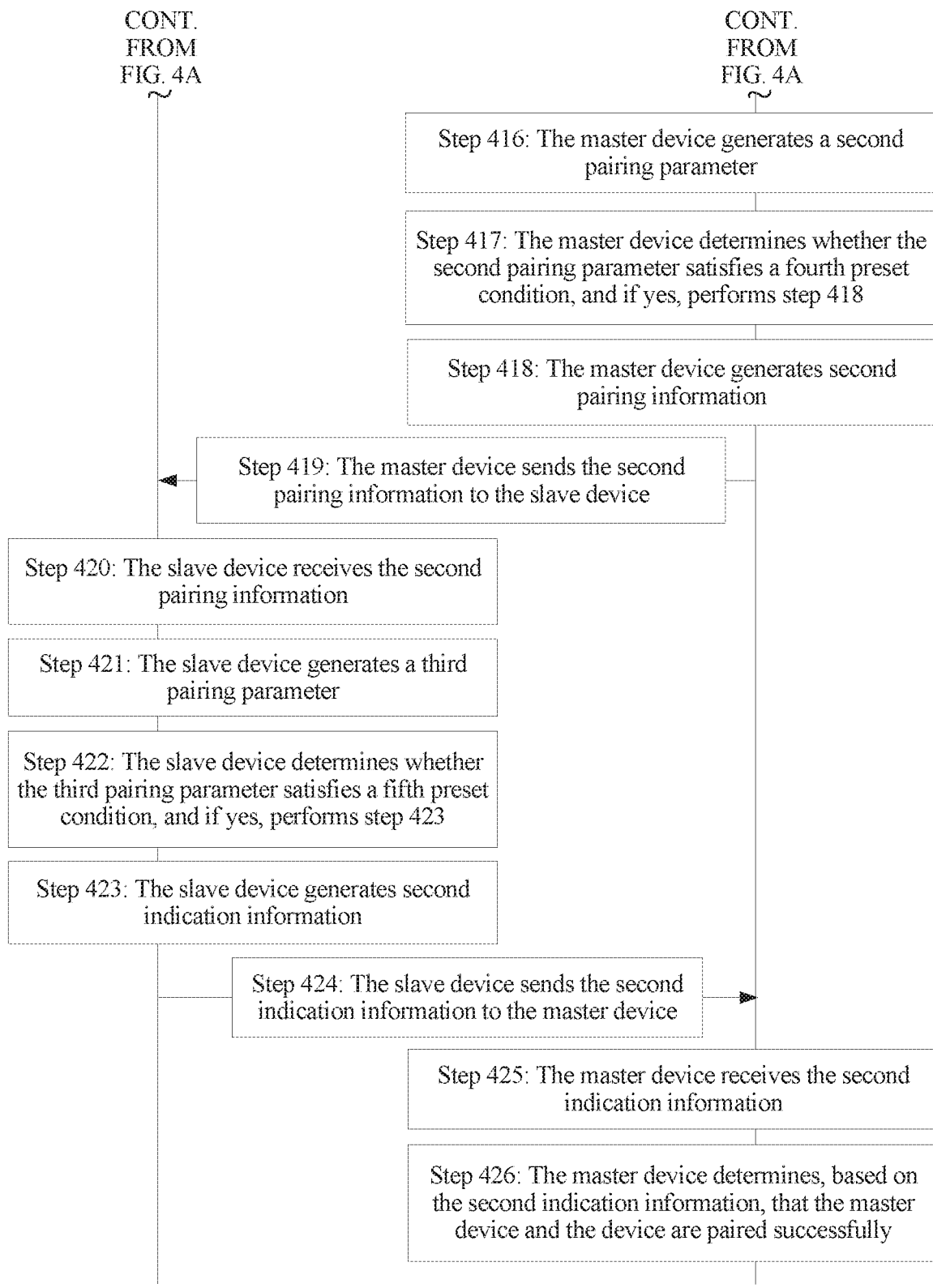

With reference to FIG. 4A and FIG. 4B, the following describes another method provided by an embodiment of the present invention. In the embodiment shown in FIG. 3A and FIG. 3B, after a physical-layer Bluetooth connection is established between the master device and the slave device, the master device sends the first pairing information to the slave device first. In the method shown in FIG. 4A and FIG. 4B in this embodiment, after a physical-layer Bluetooth connection is established between the master device and the slave device, the slave device sends the first pairing information to the master device first. For a specific execution process, refer to the following description.

Step 401: A slave device receives a Bluetooth instruction and a first Bluetooth parameter input by a user.

Step 402: A master device receives a Bluetooth instruction and a second Bluetooth parameter input by the user.

Step 403: The master device enables a Bluetooth function.

Step 404: The slave device enables a Bluetooth function.

Step 405: The master device breaks a Bluetooth pairing relationship between the master device and the target device.

Step 406: The slave device breaks a Bluetooth pairing relationship between the slave device and the target device.

Step 407: The slave device generates a broadcast packet based on the Bluetooth instruction.

Step 408: The slave device sends the broadcast packet by broadcast.

Step 409: The slave device enables a Bluetooth scan mode.

Step 410: The master device receives the broadcast packet.

Step 411: The master device determines the legal slave device.

Step 412: The master device initiates a physical-layer Bluetooth connection to the slave device.

For a specific process of performing step 401 to step 412 shown in this embodiment, refer to step 301 to step 312 in the embodiment shown in FIG. 3A and FIG. 3B. Details are not further described in this embodiment.

Step 413: The slave device generates first pairing information.

Step 414: The slave device sends the first pairing information to the master device.

Step 415: The master device receives the first pairing information.

Step 416: The master device generates a second pairing parameter.

Step 417: The master device determines whether the second pairing parameter satisfies a fourth preset condition, and if yes, performs step 418.

Step 418: The master device generates second pairing information.

Step 419: The master device sends the second pairing information to the slave device.

Step 420: The slave device receives the second pairing information.

Step 421: The slave device generates a third pairing parameter.

Step 422: The slave device determines whether the third pairing parameter satisfies a fifth preset condition, and if yes, performs step 423.

In comparison with step 314 to step 322 shown in FIG. 3A and FIG. 3B, the specific process of step 413 to step 422 shown in FIG. 4A and FIG. 4B in this embodiment differs only in execution entities. For a specific execution process, refer to the embodiment shown in FIG. 3A and FIG. 3B. Details are not further described in this embodiment.

Step 423: The slave device generates second indication information.

In this embodiment, the second indication information is used to indicate that the slave device determines that the first Bluetooth parameter and the second Bluetooth parameter are the same parameter.

Step 424: The slave device sends the second indication information to the master device.

Step 425: The master device receives the second indication information,

Step 426: The master device determines, based on the second indication information, that the master device and the device are paired successfully.

In this embodiment, the master device can determine, based on the received second indication information, that the terminal device and the peer device are paired successfully.

Optionally, the second indication information shown in this embodiment may also be a connection request message. The connection request message is used to indicate that a Bluetooth connection is successfully established between the master device and the slave device, so that the master device receiving the second indication information and the slave device can perform a Bluetooth upper-layer service.

Optionally, after the master device and the slave device are paired successfully, the master device and the slave device prompt the user of a state that the master device and the slave device are paired successfully. A mode of displaying successful pairing is not limited in this embodiment. For example, display screens of the master device and the slave device may display prompt information used to indicate the state that the master device and the slave device are paired successfully. For another example, the master device and the slave device may push, to the user, an announcement used to indicate the state that the master device and the slave device are paired successfully. A specific prompting manner is not limited in this embodiment.

For beneficial effects of using the pairing method shown in this embodiment in FIG. 4A and FIG. 4B, refer to FIG. 3A and FIG. 3B. Details are not further described in this embodiment.

Figure 5:
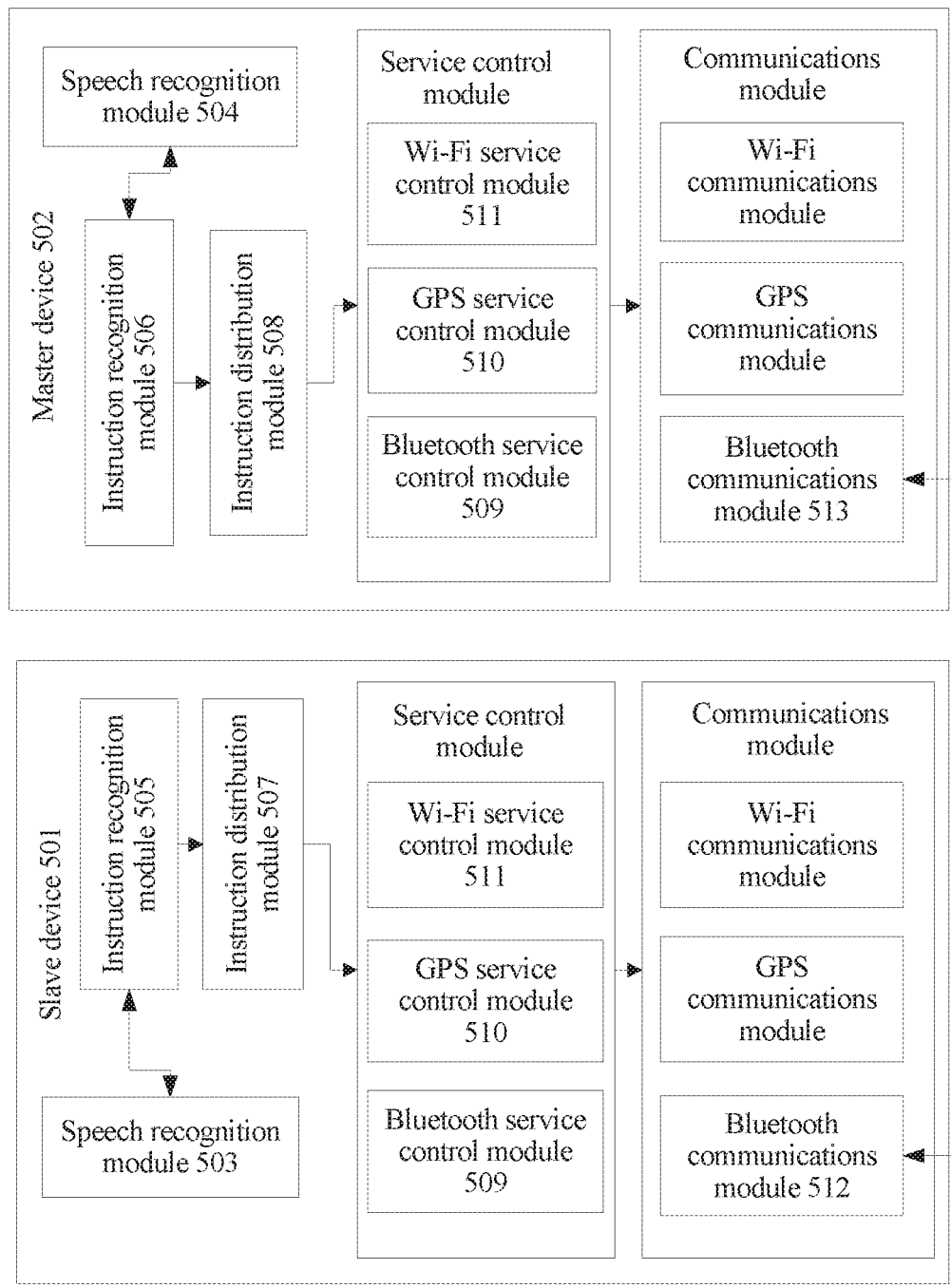
FIG. 5 is a schematic diagram of an application scenario of a Bluetooth pairing method according to the present invention.

With reference to FIG. 5, the following describes an application scenario of a pairing method shown in this embodiment.

In this application scenario, a slave device 501 is a smart watch, and a master device 502 is a smartphone.

In this application scenario, a user may perform operations on the slave device 501 and the master device 502, so that a speech recognition module 503 of the slave device 501 and a speech recognition module 504 of the master device 502 are in a working state.

The speech recognition module 503 and the speech recognition module 504 receive a Bluetooth instruction "Bluetooth pairing" input by the user. The speech recognition module 503 and the speech recognition module 504 are further configured to receive a same Bluetooth parameter "Xi'an" input by the user.

After recognizing the Bluetooth instruction and the Bluetooth parameter input by the user, the speech recognition module 503 may send the recognized Bluetooth instruction and Bluetooth parameter to an instruction recognition module 505.

After recognizing the Bluetooth instruction and the Bluetooth parameter input by the user, the speech recognition module 504 may send the recognized Bluetooth instruction and Bluetooth parameter to an instruction recognition module 506.

When recognizing the Bluetooth instruction "Bluetooth pairing", the instruction recognition module 505 may determine to perform a Bluetooth pairing procedure. In this case, the instruction recognition module 505 sends the recognized Bluetooth instruction and Bluetooth parameter to an instruction distribution module 507.

When recognizing the Bluetooth instruction "Bluetooth pairing", the instruction recognition module 506 may determine to perform a Bluetooth pairing procedure. In this case, the instruction recognition module 506 sends the recognized Bluetooth instruction and Bluetooth parameter to an instruction distribution module 508.

The instruction distribution module 507 determines, based on the Bluetooth instruction, that a current service type is a Bluetooth service, and sends the Bluetooth instruction and the Bluetooth parameter to a corresponding service control module. In this application scenario, the instruction distribution module 507 may send the Bluetooth instruction and the Bluetooth parameter to a Bluetooth service control module 509.

If the instruction distribution module 507 determines that the current service type is a GPS service, the instruction distribution module 507 sends the received instruction to a GPS service control module 510.

If the instruction distribution module 507 determines that the current service type is a Wi-Fi service, the instruction distribution module 507 sends the received instruction to a Wi-Fi service control module 511.

In this application scenario, the Bluetooth service control module 509 can perform the Bluetooth pairing process shown in the foregoing embodiment. For a specific execution process, refer to the foregoing embodiment. Details are not further described.

In this embodiment, information exchange between the slave device 501 and the master device 502 is performed by using a Bluetooth communications module 512 of the slave device 501 and a Bluetooth communications module 513 of the master device. For a specific information exchange process, refer to the foregoing embodiment. Details are not further described.

For the Bluetooth service control module, the GPS service control module, and the Wi-Fi service control module included in the master device 502, refer to the descriptions about the slave device 501. Details are not further described.

For beneficial effects of using this application scenario to perform Bluetooth pairing, refer to the foregoing embodiment. Details are not further described in this application scenario.

The method shown in this embodiment of the present invention is further described with reference to a specific application scenario.

In this application scenario, to implement a Bluetooth connection between the smartphone (master device) and the smart watch (slave device), first, the user may input the Bluetooth instruction and the Bluetooth parameter to the smartphone and the smart watch simultaneously.

In this embodiment, the user may also input the Bluetooth instruction and the Bluetooth parameter to the smartphone and the smart watch separately. This is not specifically limited in this embodiment, as long as the Bluetooth instruction and the Bluetooth parameter received by the smartphone and the smart watch are the same.

This application scenario is described by using an example in which the user inputs the Bluetooth instruction and the Bluetooth parameter to the smart watch and the smart watch simultaneously.

For illustration purposes, the following describes how the user inputs the Bluetooth instruction and the Bluetooth parameter to the smartphone. For detailed descriptions about inputting the Bluetooth instruction and the Bluetooth parameter to the smart watch, refer to the smartphone. Details are not further described in this application scenario.

Specifically, the user may control the smartphone to be in a speech recognition state.

Figure 6:
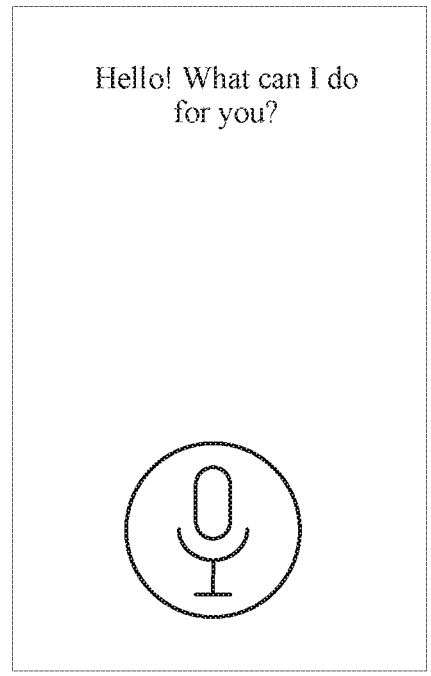
FIG. 6 is a schematic diagram of another application scenario of a Bluetooth pairing method according to the present invention.

For example, for the smartphone, the user may touch and hold a Home key of the smartphone to invoke a Siri interface of the smartphone as shown in FIG. 6.

The user may input the Bluetooth parameter and the Bluetooth instruction by using the Siri interface shown in FIG. 6.

In this application scenario, the Bluetooth instruction is "Bluetooth pairing", and the Bluetooth parameter is "7648465".

That is, the user may input a speech "Bluetooth pairing, 7648465" by using the Siri interface shown in FIG. 6.

It should be clear that, the description about the Bluetooth instruction and the Bluetooth parameter in this application scenario is an optional example, and is not limited. For details, refer to the foregoing steps. Details are not further described.

It should be clear that, the method for controlling the smartphone to be in the speech recognition state in this embodiment is an optional example, and is not limited.

For example, if an Android system and Google Now are installed in the smartphone, the user may directly input a speech "Hello, Android" to control the smartphone to be in the speech recognition state. In this case, the user may directly input the speech "Bluetooth pairing, 7648465".

Optionally, a target application may also be installed in the smartphone, and the target application is used to implement Bluetooth pairing shown in this embodiment.

Figure 7:
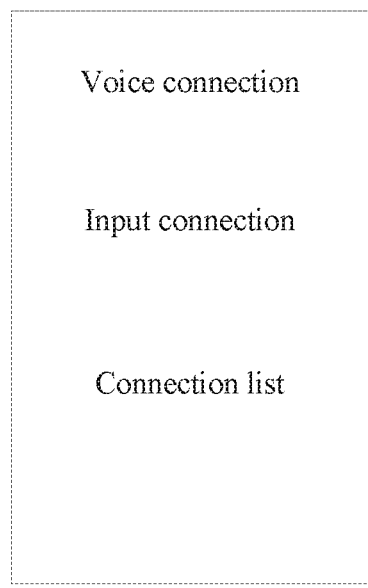
FIG. 7 is a schematic diagram of another application scenario of a Bluetooth pairing method according to the present invention.

An application interface of the target application shown in this embodiment may be shown in FIG. 7. It should be clear that, the description about the application interface shown in FIG. 7 is an optional example, and is not limited, as long as the provided application interface can receive the Bluetooth instruction and the Bluetooth parameter input by the user.

A level-1 menu (as shown in FIG. 7) of the application interface of the target application shown in this embodiment may provide a plurality of options, such as "voice connection", "input connection", or "select connection".

If the user selects "voice connection", the target application may display a level-2 interface corresponding to the voice connection, and the user may directly input the speech "Bluetooth pairing, 7648465" in the level-2 interface.

If the user selects "input connection", the target application may display a level-2 interface corresponding to the input connection, and the user may input the speech "Bluetooth pairing, 7648465" in the level-2 interface by using a virtual keyboard.

If the user selects "connection list", the target application may display a level-2 interface corresponding to the connection list. The level-2 interface displays Bluetooth parameters in historical successful Bluetooth pairing, and the user may select a Bluetooth parameter currently required for Bluetooth pairing.

The foregoing description about the manner of inputting the Bluetooth instruction and the Bluetooth parameter is an optional example, and is not limited.

After the smartphone receives the Bluetooth instruction and the Bluetooth parameter, and after the smart watch receives the Bluetooth instruction and the Bluetooth parameter, the smartphone and the smart watch may authenticate each other.

After the smartphone authenticates the smart watch successfully, and after the smart watch authenticates the smartphone successfully, the smartphone and the smart watch are paired successfully.

In this application scenario, a specific process of authenticating the smart watch by the smartphone is not described in detail. For a specific authentication process, refer to the process of authenticating the slave device by the master device shown in the foregoing embodiment. Details are not further described.

In this application scenario, a specific process of authenticating the smartphone by the smart watch is not described in detail. For a specific authentication process, refer to the process of authenticating the master device by the slave device shown in the foregoing embodiment. Details are not further described.

Figure 8:
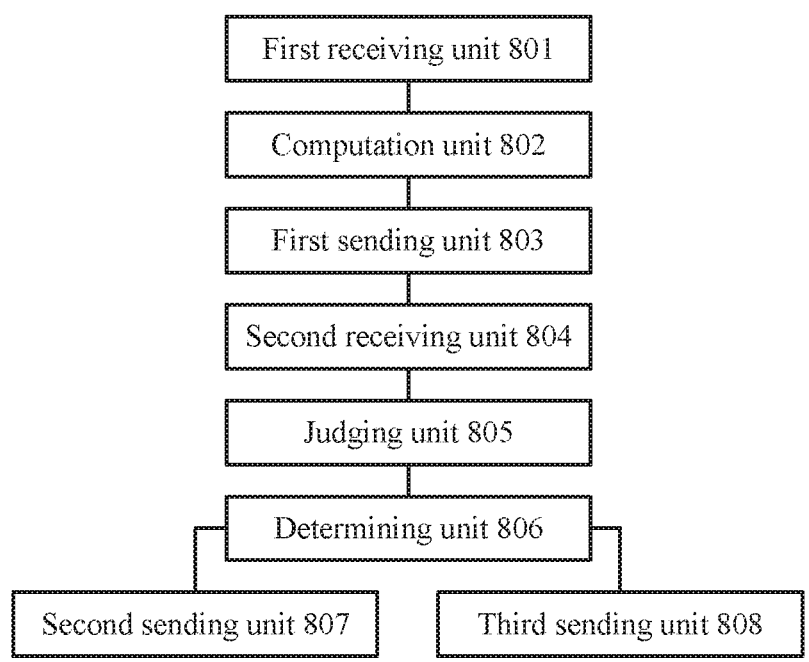
FIG. 8 is a schematic structural diagram of another embodiment of a terminal device according to the present invention.

With reference to FIG. 8, the following describes a specific structure of a terminal device shown in this embodiment.

Specifically, the terminal device shown in this embodiment is configured to perform the Bluetooth pairing method shown in the foregoing embodiment. For a specific execution process, refer to the foregoing embodiment. Details are not further described in this embodiment.

More specifically, the terminal device shown in this embodiment may be a master device in a Bluetooth pairing process. In this case, a peer device shown in this embodiment is a slave device in the Bluetooth pairing process. If the terminal device shown in this embodiment is a slave device in the Bluetooth pairing process, the peer device shown in this embodiment is a master device in the Bluetooth pairing.

Specifically, the terminal device shown in this embodiment includes:

a first receiving unit 801, configured to receive a first Bluetooth parameter input by a user;

a computation unit 802, configured to perform encryption computation based on the first Bluetooth parameter to generate first pairing information;

a first sending unit 803, configured to send the first pairing information to a peer device;

a second receiving unit 804, configured to receive second pairing information sent by the peer device, where the second pairing information is information generated by the peer device by performing encryption computation based on a second Bluetooth parameter received by the peer device;

a judging unit 805, configured to determine whether a target condition is satisfied, where the target condition is that it is determined, based on the second pairing information, that the first Bluetooth parameter is the same as the second Bluetooth parameter, and the target condition is further that the peer device has determined, based on the first pairing information, that the first Bluetooth parameter is the same as the second Bluetooth parameter; and a determining unit 806, configured to determine, if the judging unit 805 determines that the target condition is satisfied, that Bluetooth pairing between the terminal device and the peer device is successful.

Optionally, if the terminal device is a slave device in Bluetooth pairing, and the peer device is a master device in Bluetooth pairing, the terminal device further includes:

a second sending unit 807, configured to receive a Bluetooth instruction input by the user, further configured to generate a broadcast packet based on the Bluetooth instruction, and further configured to send the broadcast packet to the peer device, so that the peer device initiates a physical-layer Bluetooth connection to the terminal device based on the broadcast packet.

Optionally, the second sending unit 807 is further configured to randomly generate a first random number based on the Bluetooth instruction, further configured to set the first random number as a Bluetooth name of the terminal device, and further configured to set the first random number in the broadcast packet, so that if the peer device determines that the broadcast packet satisfies a first preset condition, the peer device sends the second pairing information to the terminal device, where the first preset condition is that the Bluetooth name of the terminal device scanned by the peer device is the same as the first random number included in the broadcast packet.

Optionally, the second sending unit 807 is further configured to randomly generate a first random number and a second random number, further configured to set the first random number as a Bluetooth name of the terminal device, further configured to perform computation on the first random number and the second random number based on a first algorithm to generate first verification data, and further configured to set the first random number, the second random number, and the first verification data in the broadcast packet, so that if the peer device determines that the broadcast packet satisfies a second preset condition, the peer device sends the second pairing information to the terminal device, where the second preset condition is that the Bluetooth name of the terminal device scanned by the peer device is the same as the first random number included in the broadcast packet, the second preset condition is further that third verification data computed by the peer device is the same as the first verification data, the third verification data is data obtained by the peer device by performing computation on the first random number and the second random number based on a third algorithm, and the third algorithm and the first algorithm are the same algorithm.

Optionally, the second sending unit 807 is further configured to randomly generate a first random number and a second random number, further configured to perform computation on the first random number and the second random number based on a second algorithm to generate second verification data, and further configured to set the first random number, the second random number, and the second verification data in the broadcast packet, so that if the peer device determines that the broadcast packet satisfies a third preset condition, the peer device sends the second pairing information to the terminal device, where the third preset condition is that fourth verification data computed by the peer device is the same as the second verification data, the fourth verification data is data obtained by the peer device by performing computation on the first random number and the second random number based on a fourth algorithm, and the fourth algorithm and the second algorithm are the same algorithm.

If the terminal device is a master device in Bluetooth pairing, and the peer device is a slave device in Bluetooth pairing, the terminal device further includes:

a third sending unit 808, configured to receive a broadcast packet sent by the peer device, where the broadcast packet is a packet generated by the peer device based on a Bluetooth instruction received by the peer device, and further configured to initiate a physical-layer Bluetooth connection to the peer device based on the broadcast packet.

Optionally, the first receiving unit 801 is further configured to perform scanning to obtain a Bluetooth name of the peer device; and the first sending unit 803 is further configured to determine whether the broadcast packet satisfies a first preset condition, where the broadcast packet includes a first random number randomly generated by the peer device, and the first preset condition is that the Bluetooth name of the scanned peer device is the same as the first random number included in the broadcast packet, and further configured to send the first pairing information to the peer device if it is determined that the broadcast packet satisfies the first preset condition.

The first receiving unit 801 is further configured to perform scanning to obtain a Bluetooth name of the peer device; and the first sending unit 803 is further configured to perform, based on a third algorithm, computation on a first random number and a second random number included in the broadcast packet to generate third verification data, further configured to determine whether the broadcast packet satisfies a second preset condition, where the second preset condition is that the Bluetooth name of the peer device scanned by the terminal device is the same as the first random number included in the broadcast packet, the second preset condition is further that the third verification data and first verification data included in the broadcast packet are the same data, the first verification data is data generated by the peer device by performing computation on the first random number and the second random number based on a first algorithm, and the third algorithm and the first algorithm are the same algorithm, and further configured to send the first pairing information to the peer device if it is determined that the broadcast packet satisfies the second preset condition.

Optionally, the first sending unit 803 is further configured to perform, based on a fourth algorithm, computation on a first random number and a second random number included in the broadcast packet to generate fourth verification data, further configured to determine whether the broadcast packet satisfies a third preset condition, where the third preset condition is that the fourth verification data and second verification data included in the broadcast packet are the same data, the second verification data is data obtained by the peer device by performing computation on the first random number and the second random number based on a second algorithm, and the fourth algorithm and the second algorithm are the same algorithm, and further configured to send the first pairing information to the peer device if it is determined that the broadcast packet satisfies the third preset condition.

The judging unit 805 is further configured to determine, based on the second pairing information, whether the first Bluetooth parameter is the same as the second Bluetooth parameter, and further configured to determine, if it is determined that the first Bluetooth parameter is the same as the second Bluetooth parameter, that the target condition is satisfied.

The judging unit 805 is further configured to determine, based on the second pairing information, whether the first Bluetooth parameter is the same as the second Bluetooth parameter, further configured to trigger the sending of the first pairing information to the peer device if it is determined that the first Bluetooth parameter is the same as the second Bluetooth parameter, and further configured to determine, if indication information sent by the peer device is received, that the target condition is satisfied, where the indication information is used to indicate that the peer device has determined that the first Bluetooth parameter is the same as the second Bluetooth parameter, or further configured to determine, by the terminal device if the indication information sent by the peer device is not received, that the target condition is not satisfied.

The computation unit 802 is further configured to receive a Bluetooth instruction input by the user, further configured to randomly generate a third random number based on the Bluetooth instruction, further configured to perform computation on the first Bluetooth parameter and the third random number based on a fifth algorithm to generate a first pairing parameter, and further configured to send the first pairing information including the first pairing parameter and the third random number to the peer device, so that the peer device performs computation on the third random number and the second Bluetooth parameter based on the fifth algorithm to generate a second pairing parameter, and that if the first pairing parameter is the same as the second pairing parameter, the peer device determines that the first Bluetooth parameter is the same as the second Bluetooth parameter.

The judging unit 805 is further configured to obtain a third pairing parameter and a fourth random number included in the second pairing information, where the fourth random number is data randomly generated by the peer device, and the third pairing information is data obtained by the peer device by performing computation on the second Bluetooth parameter and the fourth random number based on a sixth algorithm, further configured to perform computation on the first Bluetooth parameter and the fourth random number based on the sixth algorithm to generate a fourth pairing parameter, further configured to determine whether the third pairing parameter is the same as the fourth pairing parameter, and further configured to determine, if it is determined that the third pairing parameter is the same as the fourth pairing parameter, that the first Bluetooth parameter is the same as the second Bluetooth parameter, or further configured to determine, if it is determined that the third pairing parameter is different from the fourth pairing parameter, that the first Bluetooth parameter is different from the second Bluetooth parameter.

The judging unit 805 is further configured to obtain a third pairing parameter and a fourth random number included in the second pairing information, where the fourth random number is data randomly generated by the peer device, and the third pairing information is data obtained by the peer device by performing computation on the second Bluetooth parameter and the fourth random number based on a sixth algorithm, further configured to perform computation on the first Bluetooth parameter and the fourth random number based on the sixth algorithm to generate a fourth pairing parameter, further configured to determine whether the third pairing parameter is the same as the fourth pairing parameter, and further configured to determine, if it is determined that the third pairing parameter is the same as the fourth pairing parameter, that the first Bluetooth parameter is the same as the second Bluetooth parameter, or further configured to determine, by the terminal device if it is determined that the third pairing parameter is different from the fourth pairing parameter, that the first Bluetooth parameter is different from the second. Bluetooth parameter.

The terminal device shown in this embodiment is configured to perform the Bluetooth pairing method shown in the foregoing steps. For a specific execution process, refer to the foregoing embodiment. Details are not further described in this embodiment. It should also be clear that, the information sent by the terminal device shown in this embodiment in the process of performing the Bluetooth pairing method shown in the foregoing embodiment, for example, notification information used to notify that the master device is verified as an illegal device, or notification information used to indicate pairing failure, may be sent by the first sending unit 803, the second sending unit 807, or the third sending unit 808 shown in FIG. 8, or as can be known, may be sent by a unit not shown in FIG. 8. Details are not further described in this embodiment.

The procedures performed by the first receiving unit 801, the first sending unit 803, the second sending unit 807, and the third sending unit 808 shown from a perspective of a functional module in this embodiment may be performed by the communications unit 107 shown and scheduled in the physical hardware shown in FIG. 1.

The procedures performed by the computation unit 802, the judging unit 805, and the determining unit 806 shown from the perspective of a functional module in this embodiment may be performed by the processor 103 shown and scheduled in the physical hardware shown in FIG. 1.

For beneficial effects achieved by performing the Bluetooth pairing process by the terminal device shown in this embodiment, refer to the foregoing embodiment. Details are not further described in this embodiment.

An embodiment of the present invention further provides a terminal device configured to perform the Bluetooth pairing method shown in the foregoing embodiment. The terminal device includes:

one or more processors, a memory, a bus system, and one or more programs, where the processor and the memory are connected by the bus system.

The one or more programs are stored in the memory, the one or more programs include an instruction, and when the instruction is executed by the terminal device, the terminal device performs the method shown in the embodiment in FIG. 2A and FIG. 2B or FIG. 3A and FIG. 3B. For a specific execution procedure, refer to the embodiment in FIG. 2A and FIG. 2B or FIG. 3A and FIG. 3B. Details are not further described in this embodiment.

For specific structures of the processor and the memory shown in this embodiment, refer to FIG. 1. Details are not further described in this embodiment.

An embodiment of the present invention further provides a computer readable storage medium storing one or more programs, where the one or more programs include an instruction, and when the instruction is executed by a terminal device, the terminal device performs the method shown in the embodiment in FIG. 2A and FIG. 2B or FIG. 3A and FIG. 3B. Details are not further described in this embodiment.

Persons skilled in the art may clearly understand that, for the purpose of convenient and brief description, for a detailed working process of the foregoing system, apparatus, and unit, reference may be made to a corresponding process in the foregoing method embodiment, and details are not further described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A Bluetooth pairing method, comprising:
   receiving, by a terminal device, a first Bluetooth parameter input by a user;
   encrypting, by the terminal device, the first Bluetooth parameter to generate first pairing information, wherein the first pairing information comprises a first random number set as a Bluetooth name of the terminal device;
   sending, by the terminal device, the first pairing information to a peer device;
   receiving, by the terminal device, second pairing information sent by the peer device, wherein the second pairing information is generated by the peer device by performing encryption computation based on a second Bluetooth parameter received by the peer device;
   determining, by the terminal device, based on the second pairing information, that the first Bluetooth parameter is the same as the second Bluetooth parameter;
   determining, by the peer device, based on the first pairing information, that the first Bluetooth parameter is the same as the second Bluetooth parameter; and
   determining, by the terminal device, that the terminal device and the peer device are paired successfully.

2. The method of claim 1, wherein the terminal device comprises a slave device in Bluetooth pairing, and the peer device comprises a master device in Bluetooth pairing, and before sending, by the terminal device, the first pairing information to the peer device, the method further comprises:
   receiving, by the terminal device, a Bluetooth instruction input by the user;
   generating, by the terminal device, a broadcast packet based on the Bluetooth instruction; and
   sending, by the terminal device, the broadcast packet to the peer device prompting the peer device to initiate a physical-layer Bluetooth connection to the terminal device based on the broadcast packet.

3. The method of claim 2, wherein generating, by the terminal device, the broadcast packet based on the Bluetooth instruction comprises:
   generating a first random number based on the Bluetooth instruction;
   setting the first random number as a Bluetooth name of the terminal device; and
   setting the first random number in the broadcast packet to prompt the peer device to send the second pairing information to the terminal device when the Bluetooth name of the terminal device scanned by the peer device is the same as the first random number in the broadcast packet.

4. The method of claim 2, wherein generating, by the terminal device, the broadcast packet based on the Bluetooth instruction comprises:
   generating a first random number and a second random number;
   setting the first random number as a Bluetooth name of the terminal device;
   performing computation on the first random number and the second random number based on a first algorithm to generate first verification data; and
   setting the first random number, the second random number, and the first verification data in the broadcast packet to prompt the peer device to send the second pairing information to the terminal device when the Bluetooth name of the terminal device scanned by the peer device is the same as the first random number in the broadcast packet, and wherein third verification data computed by the peer device is the same as the first verification data, wherein the third verification data is data obtained by the peer device by performing computation on the first random number and the second random number based on a third algorithm, and wherein the third algorithm and the first algorithm are the same algorithm.

5. The method of claim 2, wherein generating, by the terminal device, the broadcast packet based on the Bluetooth instruction further comprises:
   generating a first random number and a second random number;
   performing computation on the first random number and the second random number based on a second algorithm to generate second verification data; and
   setting the first random number, the second random number, and the second verification data in the broadcast packet to prompt the peer device to send the second pairing information to the terminal device when fourth verification data computed by the peer device is the same as the second verification data, wherein the fourth verification data is data obtained by the peer device by performing computation on the first random number and the second random number based on a fourth algorithm, and wherein the fourth algorithm and the second algorithm are the same algorithm.

6. The method of claim 1, wherein the terminal device comprises a master device in Bluetooth pairing, and the peer device comprises a slave device in Bluetooth pairing, and before sending, by the terminal device, the first pairing information to the peer device, the method further comprises:
   receiving, by the terminal device, a broadcast packet sent by the peer device, wherein the broadcast packet is a packet generated by the peer device based on a Bluetooth instruction received by the peer device; and
   initiating, by the terminal device, a physical-layer Bluetooth connection to the peer device based on the broadcast packet.

7. The method of claim 6, wherein sending, by the terminal device, the first pairing information to the peer device further comprises:
   scanning to obtain a Bluetooth name of the peer device; and determining that the broadcast packet comprises a first random number, and wherein the Bluetooth name of the peer device scanned by the terminal device is the same as the first random number in the broadcast packet, sending the first pairing information to the peer device.

8. The method of claim 6, wherein sending, by the terminal device, the first pairing information to the peer device further comprises:
scanning to obtain a Bluetooth name of the peer device;
performing, based on a third algorithm, computation on a first random number and a second random number in the broadcast packet to generate third verification data;
determining that the Bluetooth name of the peer device scanned by the terminal device is the same as the first random number in the broadcast packet, wherein the third verification data and first verification data in the broadcast packet are the same data, wherein the first verification data is generated by the peer device by performing computation on the first random number and the second random number based on a first algorithm, and wherein the third algorithm and the first algorithm are the same algorithm; and
sending, by the terminal device, the first pairing information to the peer device.

9. The method of claim 2, wherein sending, by the terminal device, the first pairing information to the peer device comprises:
performing, based on a fourth algorithm, computation on a first random number and a second random number in the broadcast packet to generate fourth verification data;
determining that the fourth verification data and second verification data in the broadcast packet are the same data, wherein the second verification data is data obtained by the peer device by performing computation on the first random number and the second random number based on a second algorithm, and wherein the fourth algorithm and the second algorithm are the same algorithm; and
sending the first pairing information to the peer device.

10. The method of claim 1, further comprising:
determining, by the terminal device based on the second pairing information, whether the first Bluetooth parameter is the same as the second Bluetooth parameter; and
determining, by the terminal device, that the first Bluetooth parameter is the same as the second Bluetooth parameter.

11. The method of claim 10, wherein after receiving, by the terminal device, the second pairing information sent by the peer device, the method further comprises:
obtaining a third pairing parameter and a fourth random number in the second pairing information, wherein the fourth random number is generated by the peer device, and wherein the third pairing parameter is obtained by the peer device by performing computation on the second Bluetooth parameter and the fourth random number based on a sixth algorithm, and
wherein determining, by the terminal device based on the second pairing information, whether the first Bluetooth parameter is the same as the second Bluetooth parameter comprises:
performing computation on the first Bluetooth parameter and the fourth random number based on the sixth algorithm to generate a fourth pairing parameter;
determining whether the third pairing parameter is the same as the fourth pairing parameter; and
determining that the first Bluetooth parameter is the same as the second Bluetooth parameter when the third pairing parameter is the same as the fourth pairing parameter.

12. The method of claim 10, wherein after receiving, by the terminal device, the second pairing information sent by the peer device, the method further comprises obtaining, by the terminal device, a third pairing parameter and a fourth random number in the second pairing information, wherein the fourth random number is generated by the peer device, and wherein the third pairing parameter is obtained by the peer device by performing computation on the second Bluetooth parameter and the fourth random number based on a sixth algorithm, and
wherein determining, by the terminal device based on the second pairing information, whether the first Bluetooth parameter is the same as the second Bluetooth parameter comprises:
performing, by the terminal device, computation on the first Bluetooth parameter and the fourth random number based on the sixth algorithm to generate a fourth pairing parameter;
determining, by the terminal device, whether the third pairing parameter is the same as the fourth pairing parameter; and
determining, by the terminal device when the terminal device determines that the third pairing parameter is different from the fourth pairing parameter, that the first Bluetooth parameter is different from the second Bluetooth parameter.

13. The method of claim 1, wherein after receiving, by the terminal device, the second pairing information sent by the peer device, the method further comprises:
determining, based on the second pairing information, whether the first Bluetooth parameter is the same as the second Bluetooth parameter;
sending the first pairing information to the peer device when the terminal device determines that the first Bluetooth parameter is the same as the second Bluetooth parameter;
determining, by the terminal device, that the terminal device receives indication information sent by the peer device, wherein the indication information indicates that the peer device has determined that the first Bluetooth parameter is the same as the second Bluetooth parameter.

14. The method of claim 1, wherein performing, by the terminal device, the encryption computation based on the first Bluetooth parameter to generate first pairing information comprises:
receiving a Bluetooth instruction input by the user;
generating a third random number based on the Bluetooth instruction;
performing computation on the first Bluetooth parameter and the third random number based on a fifth algorithm to generate a first pairing parameter; and
sending the first pairing information comprising the first pairing parameter and the third random number to the peer device to prompt the peer device to perform computation on the third random number and the second Bluetooth parameter based on the fifth algorithm to generate a second pairing parameter; and
determining, by the peer device, that the first Bluetooth parameter is the same as the second Bluetooth parameter when the first pairing parameter is the same as the second pairing parameter.

15. A terminal, comprising:
a memory configured to store a computer executable instruction; and
a processor coupled to the memory and configured to execute the computer executable instruction stored in the memory to prompt the terminal perform:
receiving, by a terminal device, a first Bluetooth parameter input by a user;
encrypting, by the terminal device, the first Bluetooth parameter to generate first pairing information, wherein the first pairing information comprises a first random number set as a Bluetooth name of the terminal device;
sending, by the terminal device, the first pairing information to a peer device;
receiving, by the terminal device, second pairing information from the peer device, wherein the second pairing information is information generated by the peer device by performing encryption computation based on a second Bluetooth parameter received by the peer device;
determining, by the terminal device, based on the second pairing information, that the first Bluetooth parameter is the same as the second Bluetooth parameter;
determining, by the peer device, based on the first pairing information, that the first Bluetooth parameter is the same as the second Bluetooth parameter; and
determining, by the terminal device, that the terminal device and the peer device are paired successfully.

16. The terminal of claim 15, wherein the terminal device comprises a slave device in Bluetooth pairing, and the peer device comprises a master device in Bluetooth pairing, and before sending the first pairing information to the peer device, the terminal device further performs:
receiving a Bluetooth instruction input by the user;
generating a broadcast packet based on the Bluetooth instruction; and
sending the broadcast packet to the peer device prompting the peer device to initiate a physical-layer Bluetooth connection to the terminal device based on the broadcast packet.

17. The terminal of claim 15, wherein the terminal device comprises a master device in Bluetooth pairing, and the peer device comprises a slave device in Bluetooth pairing, before sending the first pairing information to the peer device, the terminal device further performs:
receiving a broadcast packet from the peer device, wherein the broadcast packet is a packet generated by the peer device based on a Bluetooth instruction received by the peer device; and
initiating a physical-layer Bluetooth connection to the peer device based on the broadcast packet.

18. The terminal of claim 17, wherein generating, by the terminal device, the broadcast packet based on the Bluetooth instruction comprises:
generating a first random number based on the Bluetooth instruction;
setting the first random number as a Bluetooth name of the terminal device; and
setting the first random number in the broadcast packet, so that the peer device sends the second pairing information to the terminal device when the Bluetooth name of the terminal device scanned by the peer device is the same as the first random number in the broadcast packet.

19. The terminal of claim 17, wherein the terminal device further performs scanning to obtain a Bluetooth name of the peer device, and wherein sending, by the terminal device, the first pairing information to the peer device comprises:
determining that the broadcast packet comprises a first random number generated by the peer device, and that the Bluetooth name of the peer device scanned by the terminal device is the same as the first random number in the broadcast packet; and
sending the first pairing information to the peer device.

20. A computer program product comprising computer-executable instructions for storage on a non-transitory computer-readable medium that, when executed by a processor, cause an apparatus to:
receive a first Bluetooth parameter input by a user;
encrypt the first Bluetooth parameter to generate first pairing information, wherein the first pairing information comprises a first random number set as a Bluetooth name of the apparatus;
send, by the apparatus, the first pairing information to a peer device;
receive, by the apparatus, second pairing information sent by the peer device, wherein the second pairing information comprises information generated by the peer device by performing encryption computation based on a second Bluetooth parameter received by the peer device;
determine, based on the second pairing information, that the first Bluetooth parameter is the same as the second Bluetooth parameter, and, based on the first pairing information, that the first Bluetooth parameter is the same as the second Bluetooth parameter; and
determine, that the apparatus and the peer device are paired successfully.

* * * * *

UNITED STATES PATENT AND TRADEMARK OFFICE
CERTIFICATE OF CORRECTION

PATENT NO. : 10,694,564 B2
APPLICATION NO. : 16/345126
DATED : June 23, 2020
INVENTOR(S) : Peng Zhao Page 1 of 1

It is certified that error appears in the above-identified patent and that said Letters Patent is hereby corrected as shown below:

On the Title Page

(73) Assignee: "HUAWEIO TECHNOLOGIES CO., LTD" should read "HUAWEI TECHNOLOGIES CO., LTD."

Signed and Sealed this
Fifteenth Day of September, 2020

Andrei Iancu
*Director of the United States Patent and Trademark Office*